(12) United States Patent
Shinotou et al.

(10) Patent No.: US 10,627,872 B2
(45) Date of Patent: Apr. 21, 2020

(54) HINGE, STAND DEVICE, AND ELECTRONIC APPARATUS

(71) Applicant: FUJITSU CLIENT COMPUTING LIMITED, Kawasaki-shi, Kanagawa (JP)

(72) Inventors: Kouichi Shinotou, Yokohama (JP); Hideki Watanabe, Kawasaki (JP); Tadanori Tachikawa, Hachioji (JP)

(73) Assignee: FUJITSU CLIENT COMPUTING LIMITED (JP)

( * ) Notice: Subject to any disclaimer, the term of this patent is extended or adjusted under 35 U.S.C. 154(b) by 123 days.

(21) Appl. No.: 15/685,070

(22) Filed: Aug. 24, 2017

(65) Prior Publication Data
US 2018/0081405 A1  Mar. 22, 2018

(30) Foreign Application Priority Data
Sep. 16, 2016 (JP) .................. 2016-182298

(51) Int. Cl.
*G06F 1/16* (2006.01)
*H04M 1/04* (2006.01)
(Continued)

(52) U.S. Cl.
CPC ............ *G06F 1/1681* (2013.01); *A45C 11/00* (2013.01); *A45C 13/005* (2013.01); *A45F 5/00* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,278,725 A | * | 1/1994 | Konno | G06F 1/1616 16/223 |
| 6,266,236 B1 | * | 7/2001 | Ku | G06F 1/162 312/223.1 |

(Continued)

FOREIGN PATENT DOCUMENTS

| | | |
|---|---|---|
| JP | S64-78312 A | 3/1989 |
| JP | 2014-17298 A | 1/2014 |

(Continued)

OTHER PUBLICATIONS

Extended European Search Report dated Feb. 6, 2018, issued in counterpart European Application No. 17188886.0. (12 pages).

(Continued)

*Primary Examiner* — Junpeng Chen
(74) *Attorney, Agent, or Firm* — Harness, Dickey & Pierce, P.L.C.

(57) ABSTRACT

A hinge, can be used for a stand of an electronic device, includes: a first hinge shaft that is provided in a rotation fulcrum of a rotary body and rotatably supports the rotary body from first rotational position to second rotational position; a second hinge shaft that is provided in parallel with the first hinge shaft; a coupling member that couples the first hinge shaft and the second hinge shaft together and is rotatably supported by the second hinge shaft; a stopper that is provided to the coupling member and regulates the second rotational position by abutting the rotary body; and a rotation restriction mechanism that restricts rotation of the coupling member until a load in a rotational direction, which is exerted on the coupling member with respect to the second hinge shaft as a center, exceeds a threshold load.

14 Claims, 20 Drawing Sheets

(51) Int. Cl.
*H04M 1/02* (2006.01)
*A45C 11/00* (2006.01)
*A45C 13/00* (2006.01)
*A45F 5/00* (2006.01)
*E05D 3/12* (2006.01)
*E05D 11/10* (2006.01)
*F16C 11/10* (2006.01)
*F16M 13/00* (2006.01)
*H04B 1/3827* (2015.01)

(52) U.S. Cl.
CPC ............ *E05D 3/12* (2013.01); *E05D 11/1028* (2013.01); *F16C 11/10* (2013.01); *F16M 13/005* (2013.01); *G06F 1/166* (2013.01); *G06F 1/1626* (2013.01); *G06F 1/1656* (2013.01); *H04B 1/3833* (2013.01); *H04M 1/022* (2013.01); *H04M 1/04* (2013.01); *A45C 2011/003* (2013.01); *A45C 2200/15* (2013.01); *E05Y 2900/606* (2013.01)

(56) References Cited

U.S. PATENT DOCUMENTS

| | | | | |
|---|---|---|---|---|
| 9,958,906 B2* | 5/2018 | Ho | ................... | G06F 1/1626 |
| 2005/0205735 A1 | 9/2005 | Ichikawa et al. | | |
| 2009/0255090 A1 | 10/2009 | Kim et al. | | |
| 2012/0309470 A1* | 12/2012 | Park | ................... | G06F 1/1681 |
| | | | | 455/575.3 |
| 2013/0152342 A1* | 6/2013 | Ahn | ................... | F16C 11/04 |
| | | | | 16/354 |
| 2013/0194741 A1* | 8/2013 | Uchiyama | ................. | E05D 3/12 |
| | | | | 361/679.26 |
| 2013/0335891 A1 | 12/2013 | Chen et al. | | |
| 2015/0309539 A1* | 10/2015 | Kamphuis | ............. | G06F 1/1681 |
| | | | | 361/679.27 |
| 2015/0362958 A1* | 12/2015 | Shang | ................... | G06F 1/1681 |
| | | | | 361/679.58 |
| 2016/0173670 A1* | 6/2016 | Langhein | ................ | H04M 1/04 |
| | | | | 455/575.1 |
| 2017/0115701 A1* | 4/2017 | Bae | ..................... | G06F 1/1652 |

FOREIGN PATENT DOCUMENTS

JP   2016-39159 A    3/2016
WO   2009/034484 A2  3/2009

OTHER PUBLICATIONS

Japanese Office Action for Patent Application No. JP 2016-182298 dated Feb. 4, 2020 (8 pages).

* cited by examiner

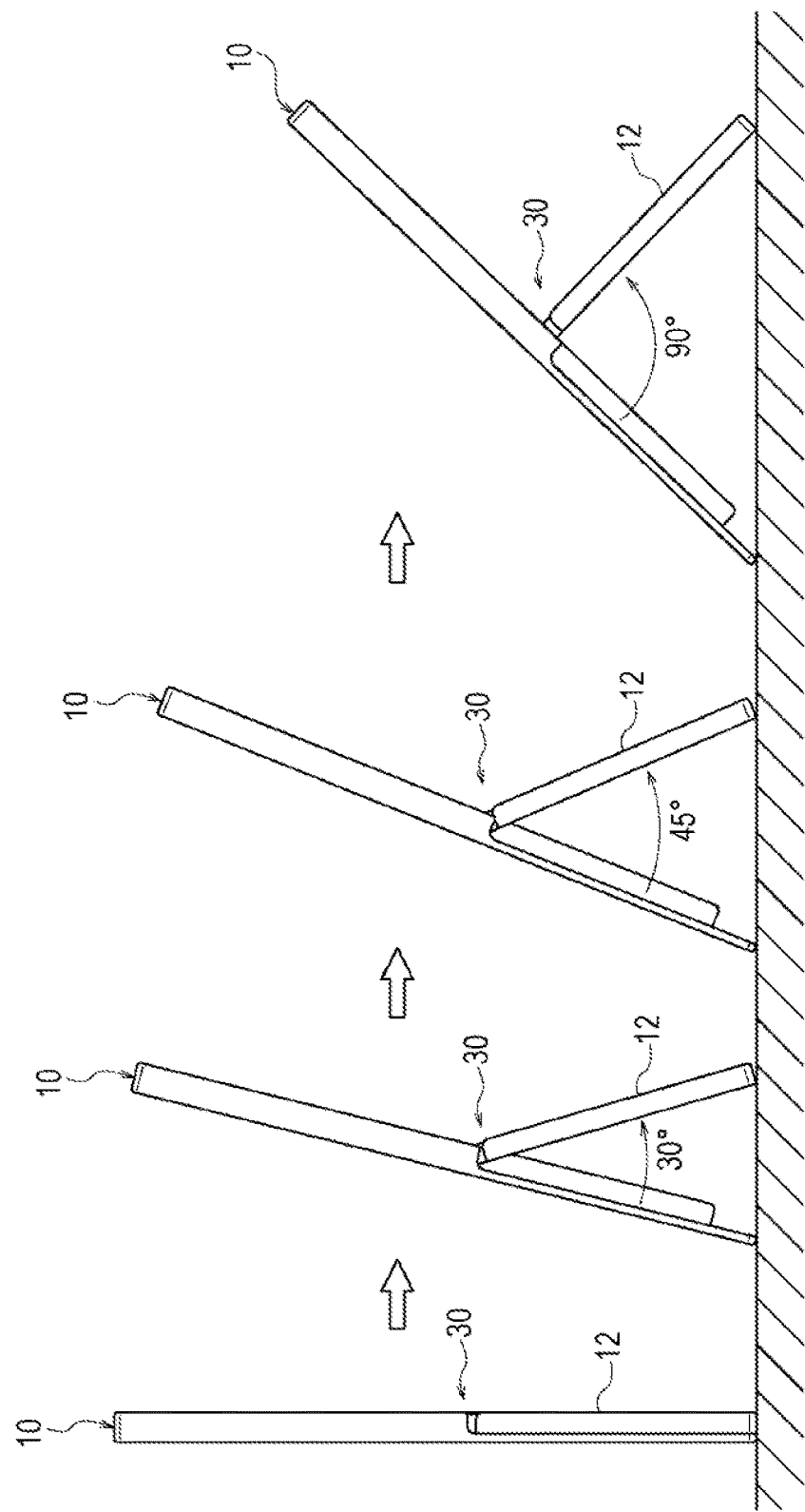

HINGE, STAND DEVICE, AND ELECTRONIC APPARATUS

CROSS-REFERENCE TO RELATED APPLICATION

This application is based upon and claims the benefit of priority of the prior Japanese Patent Application No. 2016-182298, filed on Sep. 16, 2016, the entire contents of which are incorporated herein by reference.

FIELD

The embodiment discussed herein is related to a hinge, a stand device, and an electronic apparatus.

BACKGROUND

One example of a hinge that rotatably supports a rotary body is the following (for example, see Japanese Laid-open Patent Publication No. 2016-39159). That is, a hinge that is disclosed in Japanese Laid-open Patent Publication No. 2016-39159 includes a coupling member, a first coupling portion that couples one end of the coupling member with a housing, and a second coupling portion that couples a cover as a rotary body with the other end of the coupling member.

In this hinge, the cover and the coupling member together rotate with respect to the first coupling member as the center in a usual use case where an opening angle θ of the cover is equal to or less than a prescribed angle. Further, in an overloading case where the opening angle θ of the cover becomes more than the prescribed angle, the cover rotates with respect to the second coupling portion as the center in a state where rotation of the coupling member is regulated, and damage to the cover is thereby restrained. Examples of related art include Japanese Laid-open Patent Publication No. 2014-17298.

However, in an above hinge, a coupling member rotates together with a cover when the cover rotates in a usual use in which an opening angle θ of the cover is equal to or less than a prescribed angle. Further, when the cover opens in the usual use in which the opening angle θ of the cover is equal to or less than the prescribed angle, the other end of the coupling member protrudes to the outside from the a housing. As described above, in a state where the other end of the coupling member protrudes to the outside from the housing, a second coupling portion that is provided at the other end of the coupling member is exposed to the outside from the housing, and design of a peripheral portion of the hinge may thus be degraded.

It is desirable to enable damage to a rotary body to be restrained while design in a peripheral portion of a hinge is secured.

SUMMARY

According to an aspect of the invention, a hinge includes: a first hinge shaft that is provided in a rotation fulcrum of a rotary body and rotatably supports the rotary body from first rotational position to second rotational position; a second hinge shaft that is provided in parallel with the first hinge shaft; a coupling member that couples the first hinge shaft and the second hinge shaft together and is rotatably supported by the second hinge shaft; a stopper that is provided to the coupling member and regulates the second rotational position by abutting the rotary body; and a rotation restriction mechanism that restricts rotation of the coupling member until a load in a rotational direction, which is exerted on the coupling member with respect to the second hinge shaft as a center, exceeds a threshold load.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A is a side diagram that illustrates situations in which the rotational angles of the stand arm changes from 0° to 30°, 45°, and 90° in the electronic apparatus illustrated in FIG. 1;

DESCRIPTION OF EMBODIMENT

One embodiment of the techniques disclosed by the present application will hereinafter be described reference to drawings.

(Outline of Configuration of Electronic Apparatus)

Figure 1:
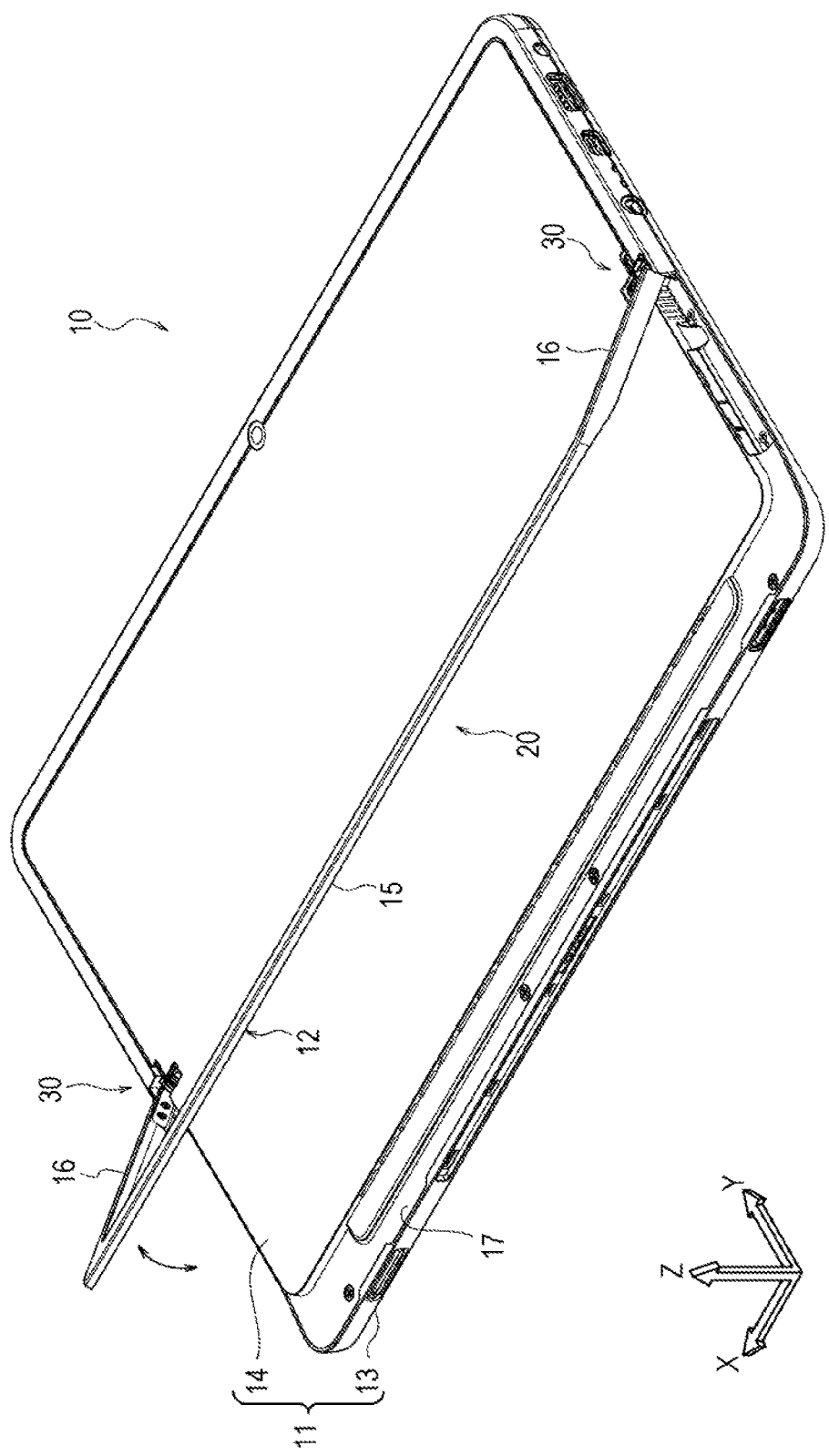
FIG. 1 is a perspective diagram of an electronic apparatus according to one embodiment of the techniques disclosed by the present application as seen from a back side.

FIG. 1 illustrates an electronic apparatus 10 according to one embodiment of the techniques disclosed by the present application. As one example, the electronic apparatus 10 is a tablet terminal. The electronic apparatus 10 includes a housing 11 and a stand arm 12. The X-axis direction, Y-axis direction, and Z-axis direction that are indicated in each of the drawings respectively indicate the horizontal direction, the vertical direction, and the thickness direction of the electronic apparatus 10.

The housing 11 is in a flat shape (flat-box shape) and includes a first cover 13 and a second cover 14 that are split in the thickness direction of the housing 11. The first cover 13 is arranged on a front side of the electronic apparatus 10, and the second cover 14 is arranged on a back side of the electronic apparatus 10. On the inside of the housing 11, an internal unit that has a control board, a battery, and so forth is accommodated. A display instrument that is driven by the internal unit is attached to the first cover 13.

The stand arm 12 is one example of "rotary body". The stand arm 12 has a bottom portion 15 that extends in the horizontal direction of the housing 11 and a pair of arm portions 16 that stand from both ends of the bottom portion 15. A step portion 17 is formed in the second cover 14 from a lower portion of the second cover 14 to both side portions.

The step portion 17 is a portion for housing the stand arm 12 and is formed into a substantially similar shape to the stand arm 12. FIG. 1 illustrates a state where the stand arm 12 is rotated by a certain angle from a housed state in the step portion 17. The stand arm 12 is rotatably supported by a hinge 30, which will be described later, with respect to the housing 11.

Figure 2:
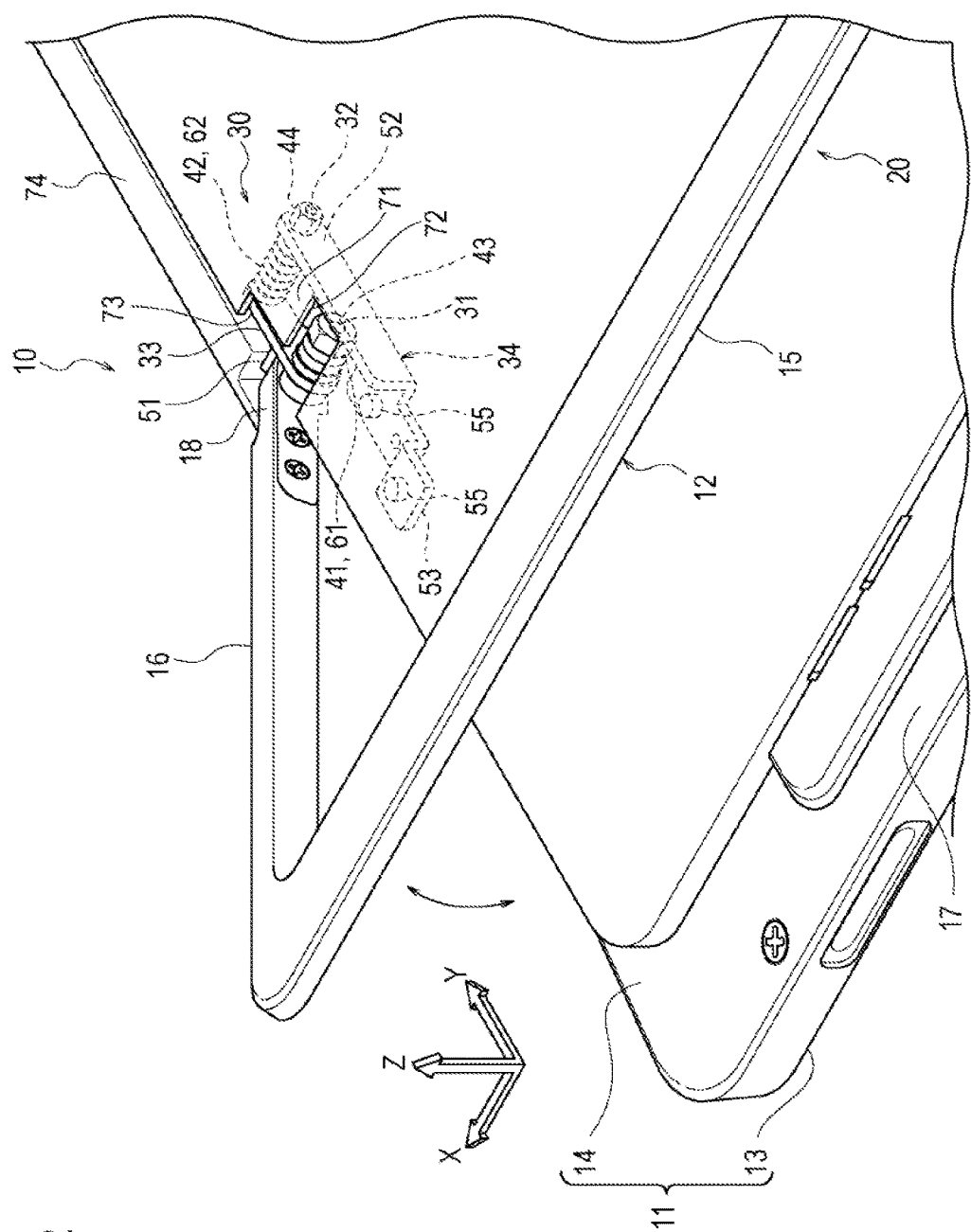
FIG. 2 is an enlarged perspective diagram of a peripheral portion of a hinge illustrated in FIG. 1.
Figure 3:
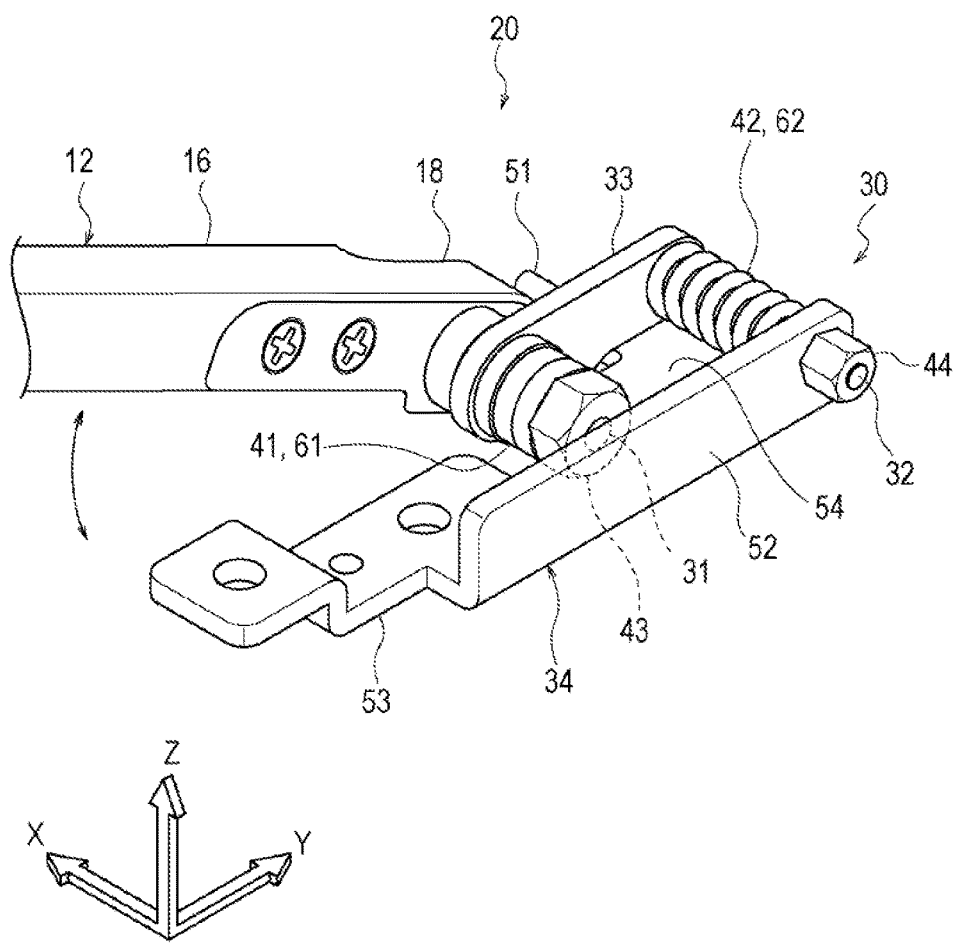
FIG. 3 is an enlarged perspective diagram of the hinge illustrated in FIG. 2.

FIG. 2 and FIG. 3 illustrate the hinge 30 on one side that rotatably supports the stand arm 12 with respect to the housing 11. The stand arm 12 is supported by a pair of hinges 30 on both sides. The stand arm 12 and the pair of hinges 30 on both sides configure a stand device 20. The pair of hinges 30 on both sides is the left-right symmetrical structure. One of the hinges 30 will be described below, but the other hinge 30 will not be described. FIG. 2 and FIG. 3 illustrate a state where the stand arm 12 rotates to 30°.

The hinge 30 is arranged in a central portion in the vertical (Y) direction of a side portion on the back side of the housing 11. The hinge 30 includes a first hinge shaft 31, a second hinge shaft 32, a coupling member 33, and a base member 34, a resistance application mechanism 41, and a rotation restriction mechanism 42.

The first hinge shaft 31 rotatably supports the stand arm 12 and is arranged to have the horizontal (X) direction of the housing 11 as the axial direction. As one example, a bolt is employed as the first hinge shaft 31. The first hinge shaft 31 is provided in a tip portion of the arm portion 16, that is, in a rotation fulcrum portion 18 of the stand arm 12. The first hinge shaft 31 passes through one end portion of the rotation fulcrum portion 18 and the coupling member 33, which will be described later, and extends inward in the horizontal direction of the housing 11. A nut 43 is screwed on a tip threaded portion of the first hinge shaft 31.

The second hinge shaft 32 rotatably supports the coupling member 33. The second hinge shaft 32 is provided in parallel with the first hinge shaft 31 and is arranged to have the horizontal direction of the housing 11 as the axial direction. Similarly to the first hinge shaft 31, as one example, a bolt is employed as the second hinge shaft 32. The second hinge shaft 32 passes through the other end portion of the coupling member 33, which will be described later, and a support portion 52 of the base member 34, which will also be described later, and extends inward in the horizontal direction of the housing 11. A nut 44 is screwed on a tip threaded portion of the second hinge shaft 32.

As one example, the coupling member 33 is formed into a plate shape. The coupling member 33 is arranged to have the axial direction of the first hinge shaft 31 and the second hinge shaft 32 as a plate-thickness direction. The coupling member 33 couples the first hinge shaft 31 and the second hinge shaft 32 together. The arm length of the stand arm 12 from the first hinge shaft 31 is longer than the distance between the shafts of the first hinge shaft 31 and the second hinge shaft 32.

Figure 4:
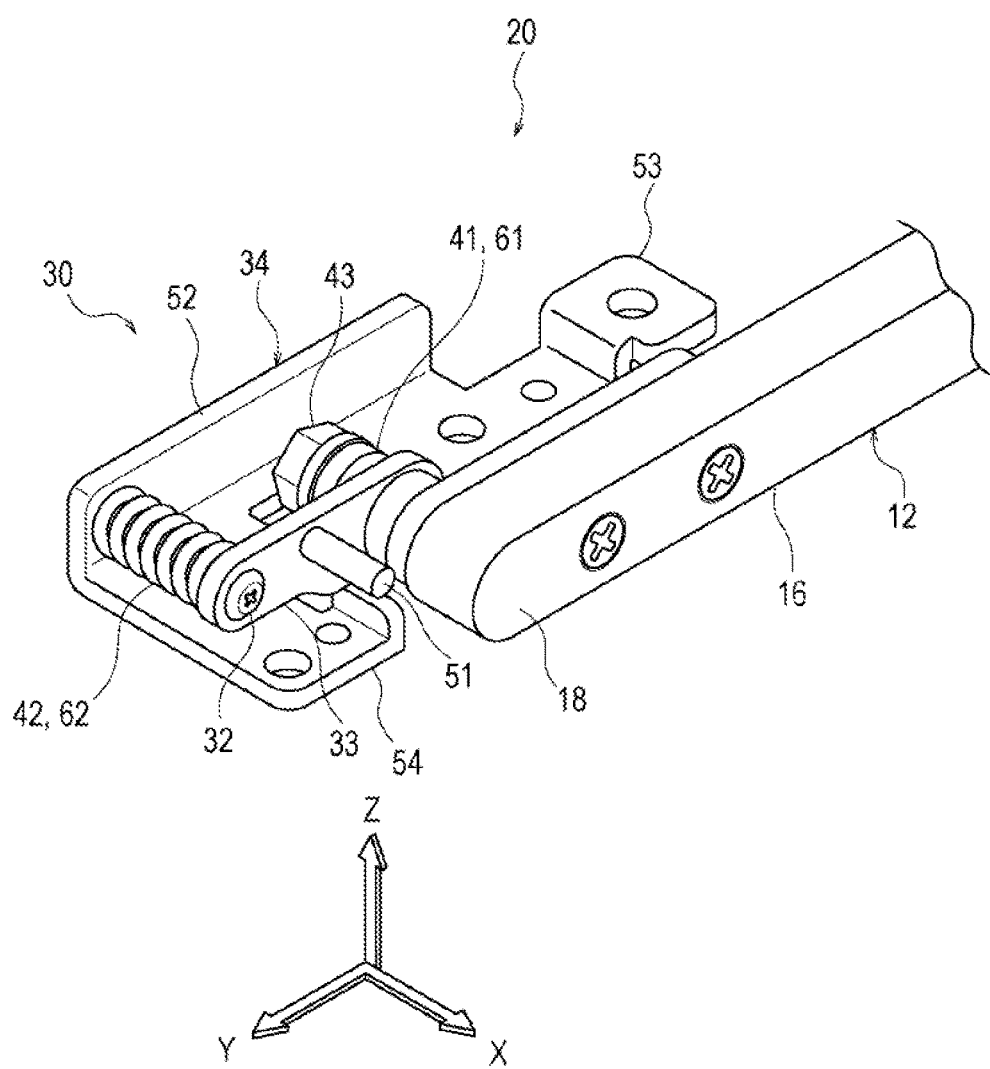
FIG. 4 is a perspective diagram of the hinge illustrated in FIG. 3 as seen from the opposite side to FIG. 3.

FIG. 4 illustrates a diagram of the hinge 30 as seen from the opposite side to FIG. 3. As illustrated in FIG. 4, a stopper portion 51 in a pin shape that protrudes outward in the horizontal direction of the housing 11 is formed in the coupling member 33. The stopper portion 51 abuts the stand arm 12 and thereby regulates the rotation of the stand arm 12.

The base member 34 illustrated in FIG. 2 is formed of sheet metal, for example, and includes the support portion 52, a fixing portion 53, and an extending portion 54 (see FIG. 3 and FIG. 4, appropriately). The whole base member 34 that includes the support portion 52, the fixing portion 53, and the extending portion 54 is in a plate shape.

Similarly to the coupling member 33, the support portion 52 is arranged to have the axial direction of the first hinge shaft 31 and the second hinge shaft 32 as a plate-thickness direction (Z direction). The support portion 52 is arranged on the inside of the coupling member 33 in the horizontal direction of the housing 11 and is arranged to be opposed to the coupling member 33 in the horizontal direction of the housing 11. The support portion 52 extends in the vertical direction of the housing 11 and is provided in parallel with the coupling member 33. A tip portion of the above-described second hinge shaft 32 passes through an end portion of the support portion 52 that is positioned on an upper side in the vertical direction of the housing 11, and the second hinge shaft 32 is supported by the support portion 52. Further, the above-described first hinge shaft 31 is supported by the support portion 52 via the coupling member 33 and the second hinge shaft 32.

The fixing portion 53 extends from the support portion 52 downward in the vertical direction of the housing 11, and the extending portion 54 extends from the support portion 52 outward in the horizontal direction of the housing 11. The fixing portion 53 and the extending portion 54 are arranged to have the thickness direction of the housing 11 as a plate-thickness direction. The fixing portion 53 is fixed to a back surface portion of the second cover 14 by plural screws 55.

Similarly to the fixing portion 53, the extending portion 54 illustrated in FIG. 3 and FIG. 4 is fixed to the back surface portion of the second cover 14, which is illustrated in FIG. 2, by the screws. The fixing portion 53 and the extending portion 54 are fixed to the back surface portion of the second cover 14, and the hinge 30 is thereby mounted on the housing 11. Further, the hinge 30 is mounted on the housing 11, and the above-described stand arm 12 is thereby rotatably supported with respect to the housing 11.

The resistance application mechanism 41 illustrated in FIG. 3 and FIG. 4 is for applying resistance in a rotational direction to the stand arm 12 in a usual use case of the stand arm 12 and is provided to the first hinge shaft 31. The resistance application mechanism 41 has plural thrust washers 61. The first hinge shaft 31 is inserted in the inside of the plural thrust washers 61, and the plural thrust washers 61 are retained by the first hinge shaft 31 in a state where the plural thrust washers 61 overlap with each other. The resistance application mechanism 41 that includes the plural thrust washers 61 is arranged between the coupling member 33 and the support portion 52.

In the resistance application mechanism 41, the screwing amount of the nut 43 with respect to the tip threaded portion of the first hinge shaft 31 is adjusted, and the contact pressure among the plural thrust washers 61 is thereby changed. Further, the contact pressure among the plural thrust washers 61 is changed, and the resistance in the rotational direction that is applied to the stand arm 12 by the resistance application mechanism 41 is thereby changed.

The rotation restriction mechanism 42 is for restricting the rotation of the coupling member 33 in the usual use case of the stand arm 12 and is provided to the second hinge shaft 32. The rotation restriction mechanism 42 has a torsion spring 62. The second hinge shaft 32 is inserted in the inside of a helical portion as a main portion of the torsion spring 62, and the torsion spring 62 is retained by the second hinge shaft 32. One end of the torsion spring 62 is fixed to the coupling member 33, and the other end of the torsion spring 62 is fixed to the support portion 52.

As illustrated in FIG. 2, in a state where the coupling member 33 extends along the vertical direction of the housing 11, that is, in a state at a time before the coupling member 33 rotates, the torsion spring 62 is in a free state, for example. Alternatively, in the state at a time before the coupling member 33 rotates, the torsion spring 62 is in an elastically deformed state such that the coupling member 33 is urged toward an internal portion of the housing 11 (toward the front side of the housing 11). The torsion spring 62 elastically deforms in a stretching direction in response to the rotation of the coupling member 33 toward the back side of housing 11. As illustrated in FIG. 3 and FIG. 4, the rotation restriction mechanism 42 that includes the torsion spring 62 is arranged between the coupling member 33 and the support portion 52.

In the rotation restriction mechanism 42, the spring constant of the torsion spring 62 is changed, and the restriction force in the rotational direction that is applied to the coupling member 33 by the rotation restriction mechanism 42 is thereby changed. The restriction force of the rotation restriction mechanism 42, that is, the spring constant of the torsion spring 62 will later be described more in detail.

(Details of Hinge)

Next, a more detailed description will be made about the structure of the hinge 30 in addition to actions of the hinge 30.

The stand arm 12 rotates from 0° to 180° by being supported by the hinge 30. FIG. 5A to FIG. 5D illustrate a situation in which the stand arm 12 rotates from 0° to 180°, and FIG. 6A to FIG. 6D illustrate the actions of the hinge 30 that correspond to the rotation of the stand arm 12 illustrated in FIG. 5A to FIG. 5D. Further, FIG. 7 is a diagram that explains the positional relationship between the stand arm 12 and the stopper portion 51. FIG. 7 illustrates situations in which the rotational angle of the stand arm 12 changes from 0° to 135° and 180°. A description will separately be made below for each rotational range of the stand arm 12.

(Case where the Stand Arm 12 Rotates from 0° to 30°)

Figure 5A:
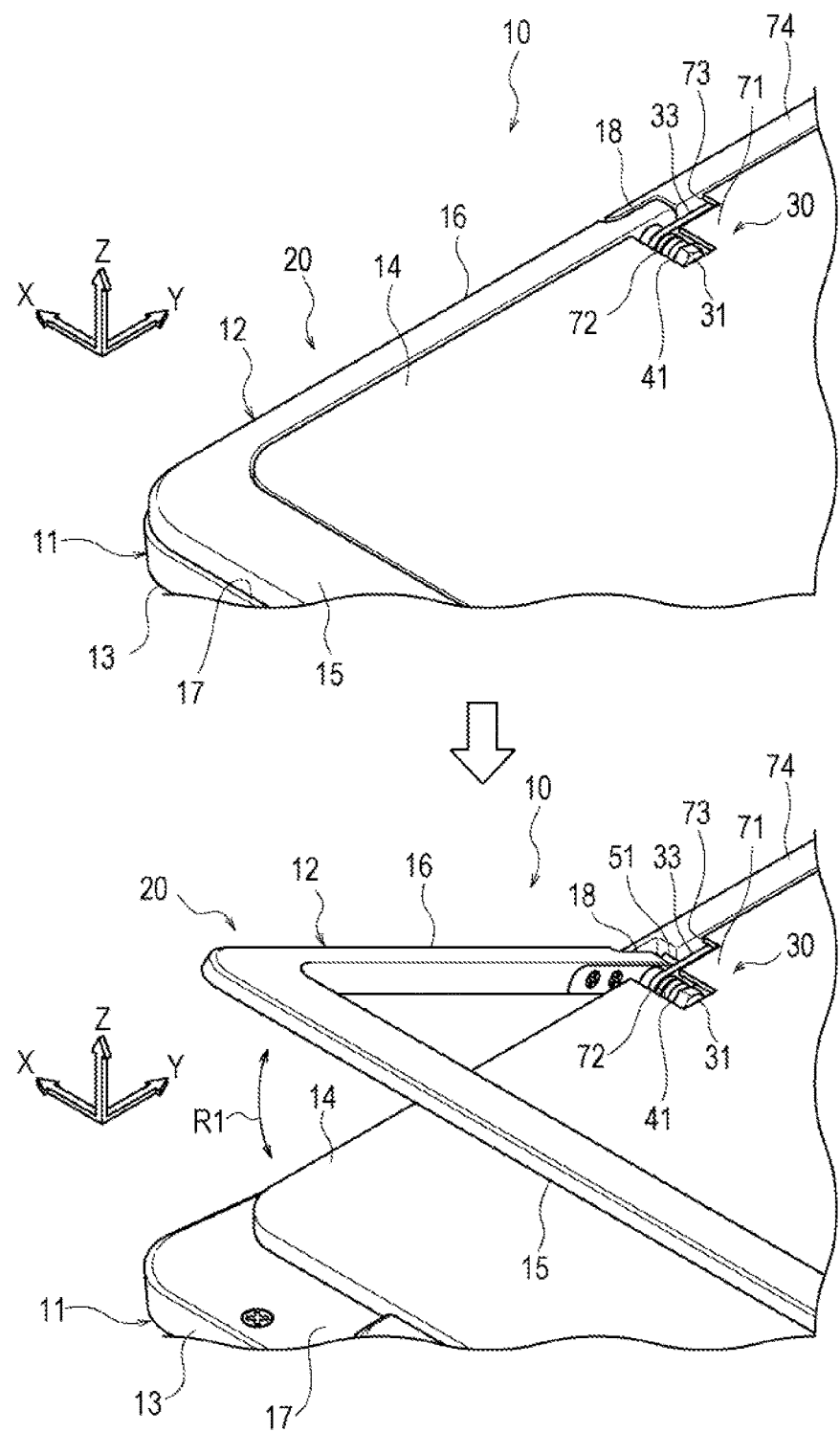
FIG. 5A is a perspective diagram that illustrates a situation in which a stand arm illustrated in FIG. 1 rotates from 0° to 30°.
Figure 6A:
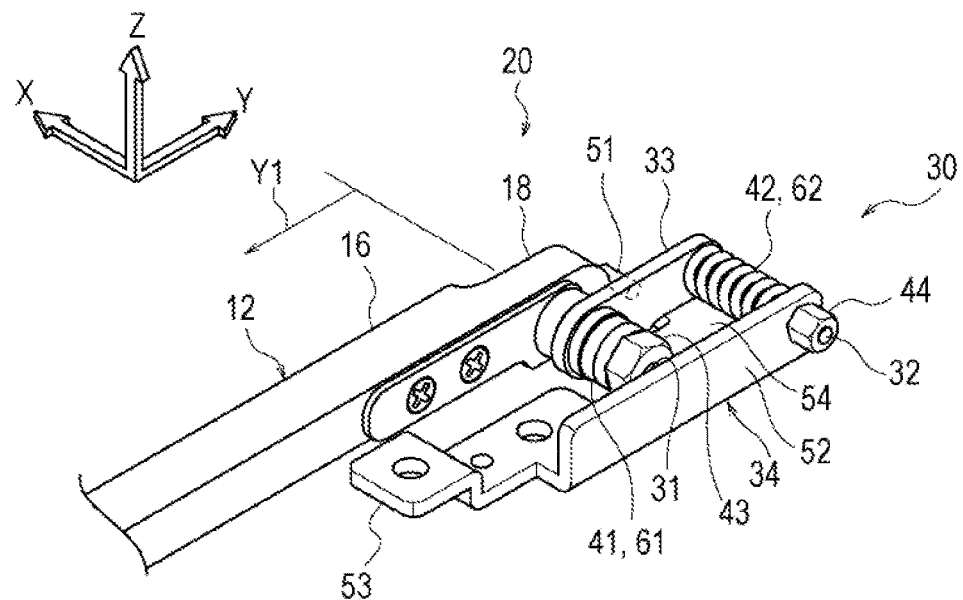
FIG. 6A is a perspective diagram that illustrates an action of the hinge that corresponds to the rotation of the stand arm illustrated in FIG. 5A.
Figure 6A:
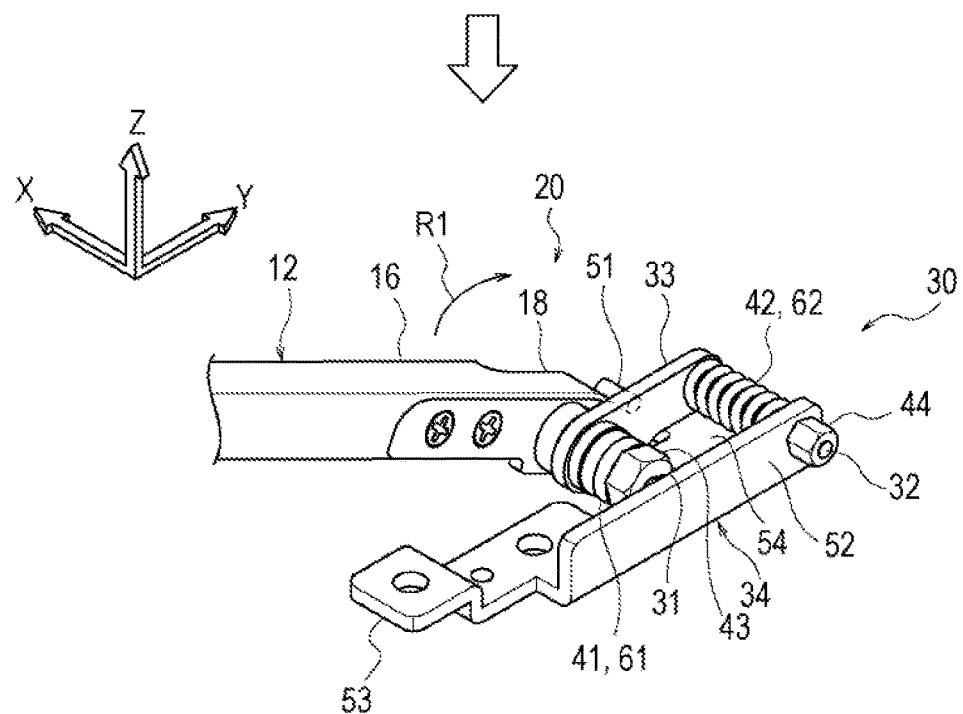
Figure 7:
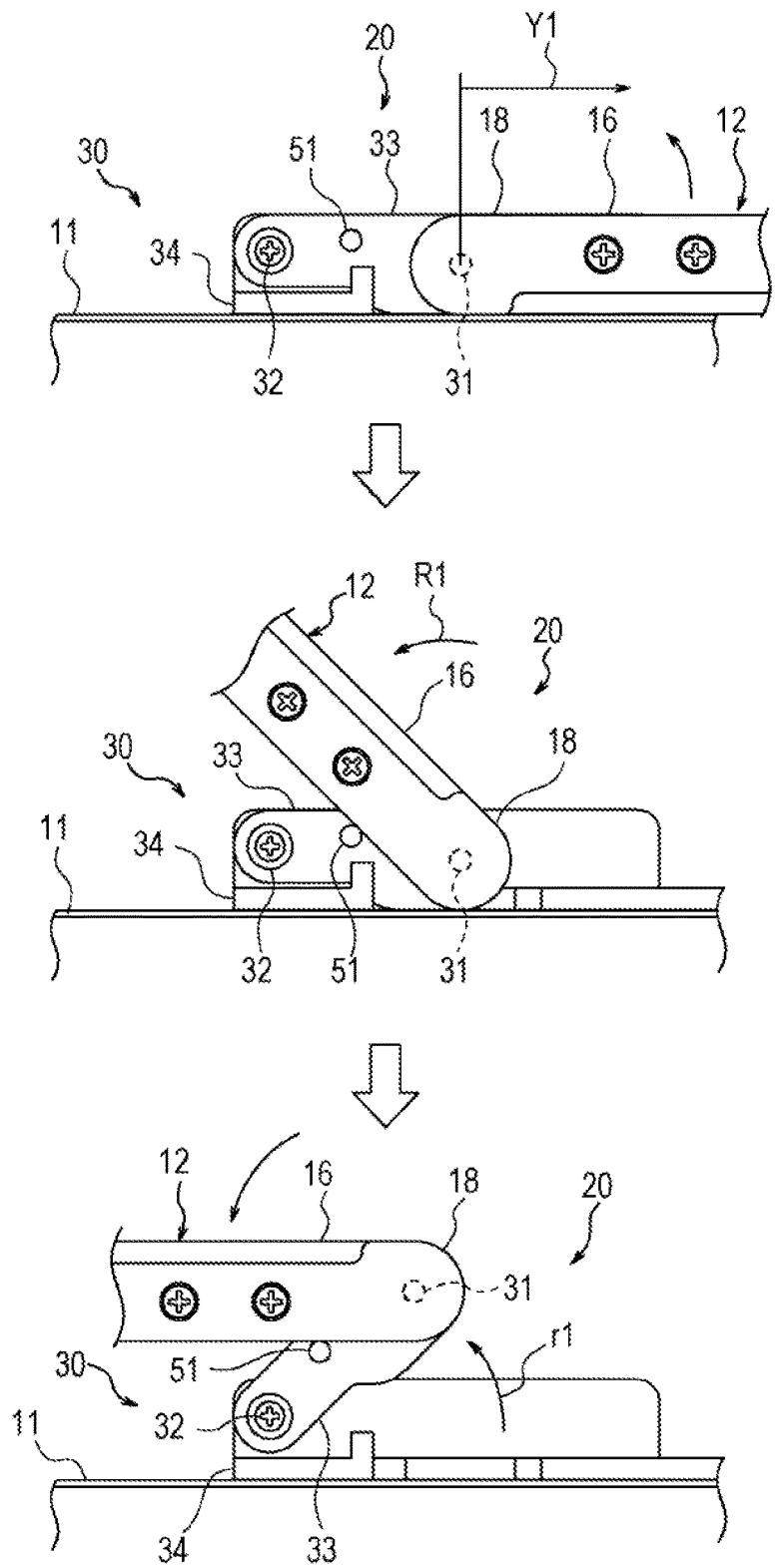
FIG. 7 is a diagram that explains the positional relationship between the stand arm and a stopper portion that are illustrated in FIG. 6A to FIG. 6D and is a side diagram that illustrates situations in which the rotational angle of the stand arm changes from 0° to 135° and 180°.

FIG. 5A and FIG. 6A illustrate a situation in which the stand arm 12 rotates from 0° to 30°. As illustrated in the upper parts of FIG. 5A and FIG. 6A, in a case where the rotational angle of the stand arm 12 is 0°, the stand arm 12 is housed in the step portion 17 that is formed in the housing 11. The rotational position of the stand arm 12 in a case where the stand arm 12 is housed in the step portion 17 will hereinafter be referred to as "housed position". The housed position is one example of "one rotational position".

In a state where the stand arm 12 is in the housed position, the coupling member 33 extends in the vertical direction of the housing 11. The extending portion 54 is arranged on the front side of the housing 11 of the coupling member 33, and the rotation of the coupling member 33 toward the front side of the housing 11 is regulated by the extending portion 54.

The second cover 14 that is a peripheral portion of the hinge 30 is formed as an accommodating portion 71 that accommodates the whole hinge 30 including the first hinge shaft 31, the second hinge shaft 32, and the coupling member 33. In the accommodating portion 71, a first recess portion 72 and a second recess portion 73 are formed. The first hinge shaft 31 and the resistance application mechanism 41 go in and out the first recess portion 72 in response to the rotation of the coupling member 33 and one end side (the side provided with the first hinge shaft 31) of the coupling member 33 goes in and out the second recess portion 73 in response to the rotation of the coupling member 33.

In a state at a time before the coupling member 33 rotates, that is, in a state where the coupling member 33 extends in the vertical direction of the housing 11, the whole hinge 30 including the first hinge shaft 31, the second hinge shaft 32, and the coupling member 33 is accommodated in the inside of the housing 11 (the accommodating portion 71). The rotational position of the coupling member 33 in a case where the coupling member 33 is accommodated in the accommodating portion 71 in a state where the coupling member 33 extends in the vertical direction of the housing 11 will hereinafter be referred to as "accommodated position".

The first hinge shaft 31 and the second hinge shaft 32 are arranged in the same position in the thickness direction of the housing 11 (the same height in the Z-axis direction) in a case where the coupling member 33 is in the accommodated position. Further, in a case where the stand arm 12 is in the housed position and the coupling member 33 is in the accommodated position, the stand arm 12 is arranged on the opposite side (arrow Y1 side in FIG. 6A) to the second hinge shaft 32 with respect to the first hinge shaft 31, and the arm portion 16 of the stand arm 12 and the coupling member 33 are linearly arranged (see the upper part of FIG. 7 also).

Then, as illustrated in the upper parts to the lower parts of FIG. 5A and FIG. 6A, in a case where an operating force is added to the stand arm 12 in the housed position in a deployment direction, the stand arm 12 rotates with respect to the first hinge shaft 31 as the center. Here, the second hinge shaft 32 is provided with the rotation restriction mechanism 42 that has the torsion spring 62. The rotation restriction mechanism 42 is for restricting the rotation of the coupling member 33 in the usual use case of the stand arm 12. The restriction force of the rotation restriction mechanism 42 is regulated by the spring constant of the torsion spring 62.

More in detail describing the spring constant of the torsion spring 62, the spring constant of the torsion spring 62 is set as described in the following. That is, the spring constant of the torsion spring 62 is set to an appropriate value such that the rotation of the coupling member 33 is restricted until the load in the rotational direction that is exerted on the coupling member 33 exceeds a threshold load even in a case where the operating force is added to the stand arm 12 in the housed position in the deployment direction. The threshold load that restricts the rotation of the coupling member 33 is regulated by the spring constant of the torsion spring 62 and is set to an arbitrary value in consideration of a case where an overload is exerted on the stand arm 12.

Thus, in a case where a usual operating force is added to the stand arm 12 in the housed position in the deployment direction, the load in the rotational direction that is exerted on the coupling member 33 becomes equal to or less than the threshold load. Accordingly, in this case, in a state where the rotation of the coupling member 33 is restricted by the rotation restriction mechanism 42, the stand arm 12 rotates in the deployment direction from the housed position with respect to the first hinge shaft 31 as the center.

In this embodiment, in a case where the stand arm 12 is in the housed position, the arrangement of the first hinge shaft 31 and the second hinge shaft 32 are set such that the stand arm 12 is positioned on the opposite side (arrow Y1 side in FIG. 6A) to the second hinge shaft 32 with respect to the first hinge shaft 31. Accordingly, the stand arm 12 rotates toward the side that is closer to the second hinge shaft 32 (arrow R1 side in FIG. 6A) in a case where the stand arm 12 rotates in the deployment direction from the housed position. The mechanical arrangement of the stand arm 12, the first hinge shaft 31, and the second hinge shaft 32 will later be described more in detail with reference to FIGS. 10A and 10B.

(Case where the Stand Arm 12 Rotates from 30° to 135°)

Figure 5B:
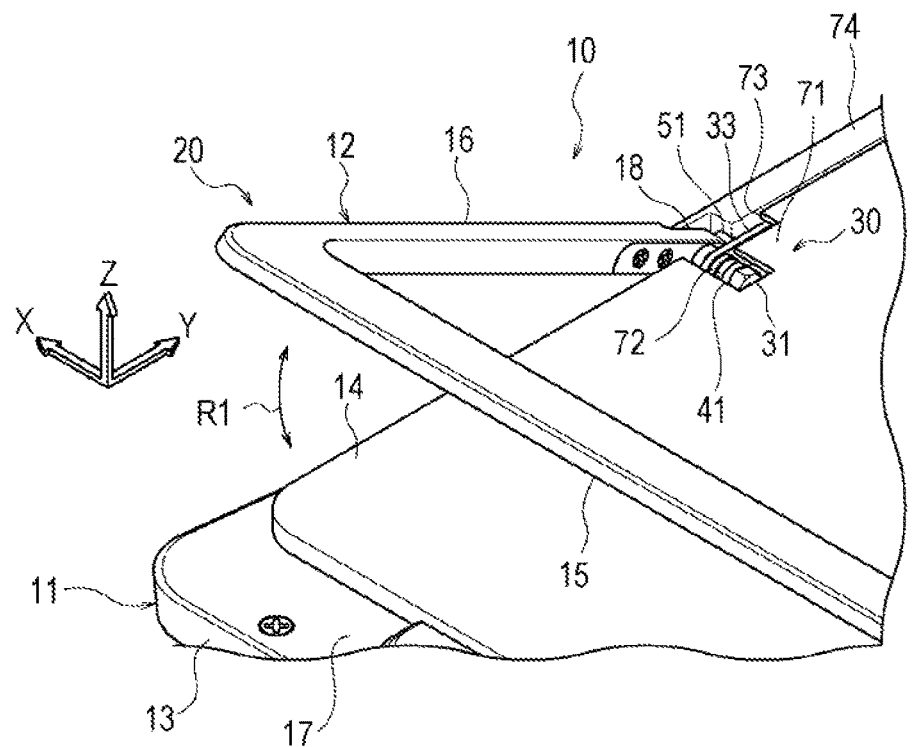
FIG. 5B is a perspective diagram that illustrates a situation in which the stand arm illustrated in FIG. 1 rotates from 30° to 135°.
Figure 5B:
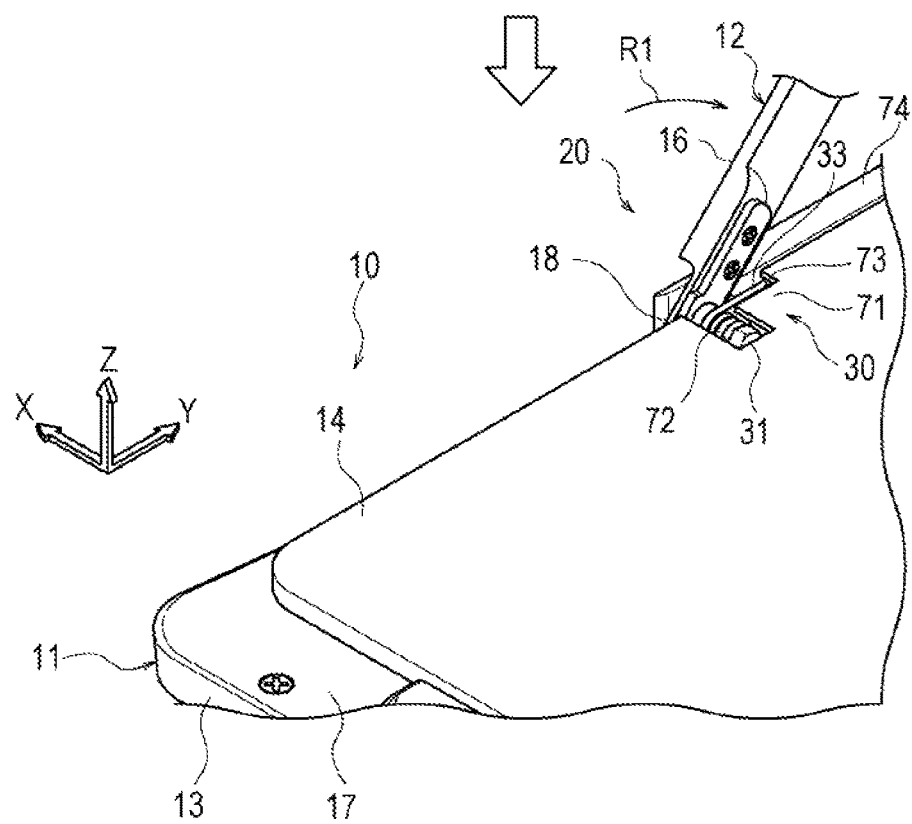
Figure 6B:
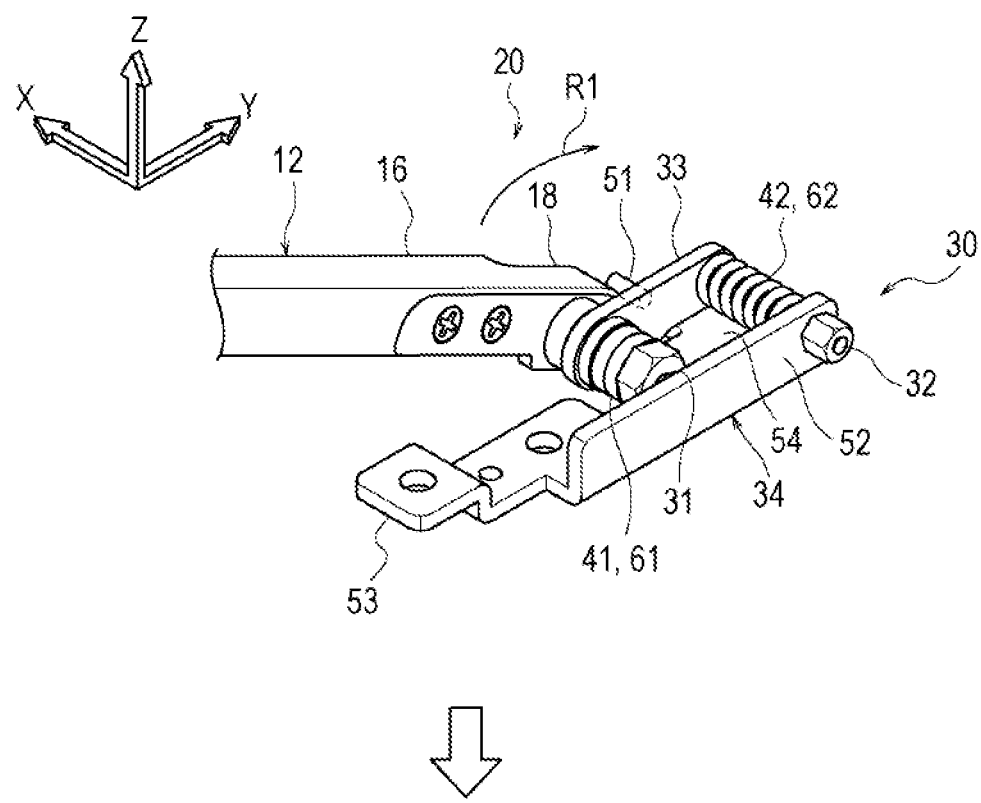
FIG. 6B is a perspective diagram that illustrates an action of the hinge that corresponds to the rotation of the stand arm illustrated in FIG. 5B.
Figure 6B:
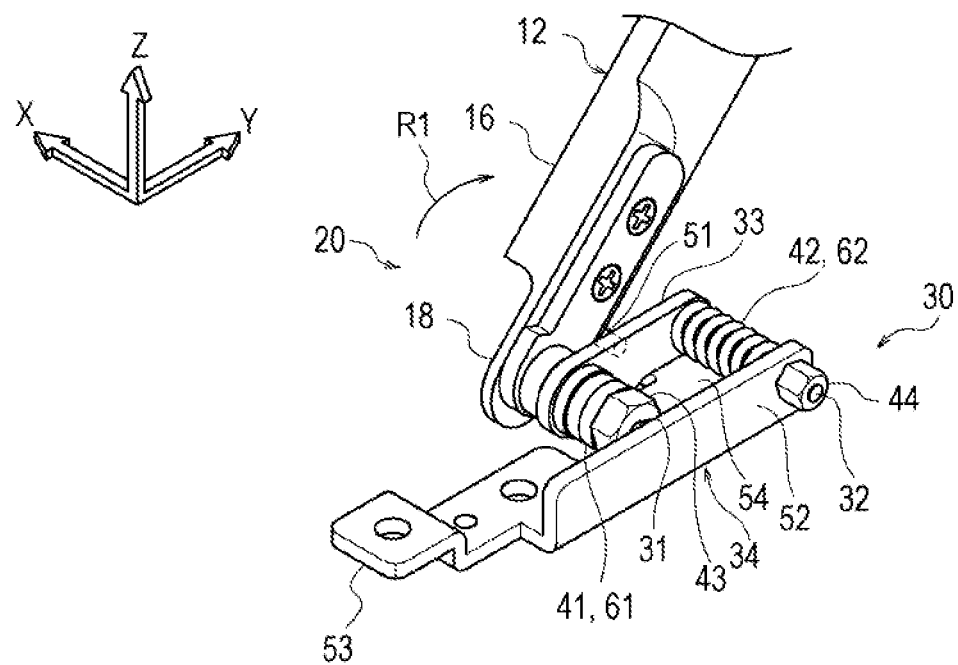

FIG. 5B and FIG. 6B illustrate a situation in which the stand arm 12 rotates from 30° to 135°. As illustrated in the upper parts to the lower parts of FIG. 5B and FIG. 6B, in a case where the stand arm 12 rotates in the deployment direction and the rotational angle of the stand arm 12 becomes 135°, the stopper portion 51 provided to the coupling member 33 abuts the stand arm 12, and the rotation of the stand arm 12 is thereby restricted (see the intermediate part of FIG. 7 also).

The stopper portion 51 abuts the arm portion 16 of the stand arm 12 in a case where the rotational angle of the stand arm 12 is 135° and thereby regulates the rotation of the stand arm 12. The rotational position of the stand arm 12 in a case where the rotation of the stand arm 12 is regulated by the stopper portion 51 will hereinafter be referred to as "deployed position". The deployed position is one example of "the other rotational position". The stopper portion 51 abuts the arm portion 16 of the stand arm 12 and thereby regulates the deployed position.

In this embodiment, as one example, the rotational angle of the stand arm 12 from the housed position to the deployed position is set to 135° that is larger than 90°. Unless an overload (an overload to rotate the coupling member 33 against the restriction force of the rotation restriction mechanism 42) is added to the stand arm 12 in the deployed position in the direction to exceed the deployed position, the coupling member 33 is maintained in the accommodated position, and the rotational angle of the stand arm 12 is retained at 135°.

While the usual operating force is added to the stand arm 12 and the stand arm 12 rotates from the housed position to the deployed position, the rotation of the coupling member 33 is restricted by the rotation restriction mechanism 42, and the coupling member 33 is thereby maintained in the accommodated position. Further, while the stand arm 12 rotates from the housed position to the deployed position, the coupling member 33 is maintained in the accommodated position in which the coupling member 33 and the first hinge shaft 31 together are accommodated in the accommodating portion 71.

Here, a description will be made about the restriction of the rotation of the coupling member 33 by the above-described rotation restriction mechanism 42. This "restriction" means restricting the rotation of the coupling member 33 in a case where the usual operating force is added to the stand arm 12 in the housed position in the deployment direction and where the load in the rotational direction that is exerted on the coupling member 33 is equal to or lower than the threshold load.

Further, as described later, in a case where an excessive force is added to the stand arm 12 or the electronic apparatus 10 is dropped in a state where the stand arm 12 is deployed to 135°, an overload may be added to the stand arm 12. The "restriction" means releasing the restriction of the rotation of the coupling member 33 by the rotation restriction mechanism 42 and allowing the stand arm 12 to rotate with the rotation of the coupling member 33 in a case where an overload is added to the stand arm 12 and the load in the rotational direction that is exerted on the coupling member 33 exceeds the threshold load.

(Case where the Stand Arm 12 Rotates from 135° to 150°)

Figure 5C:
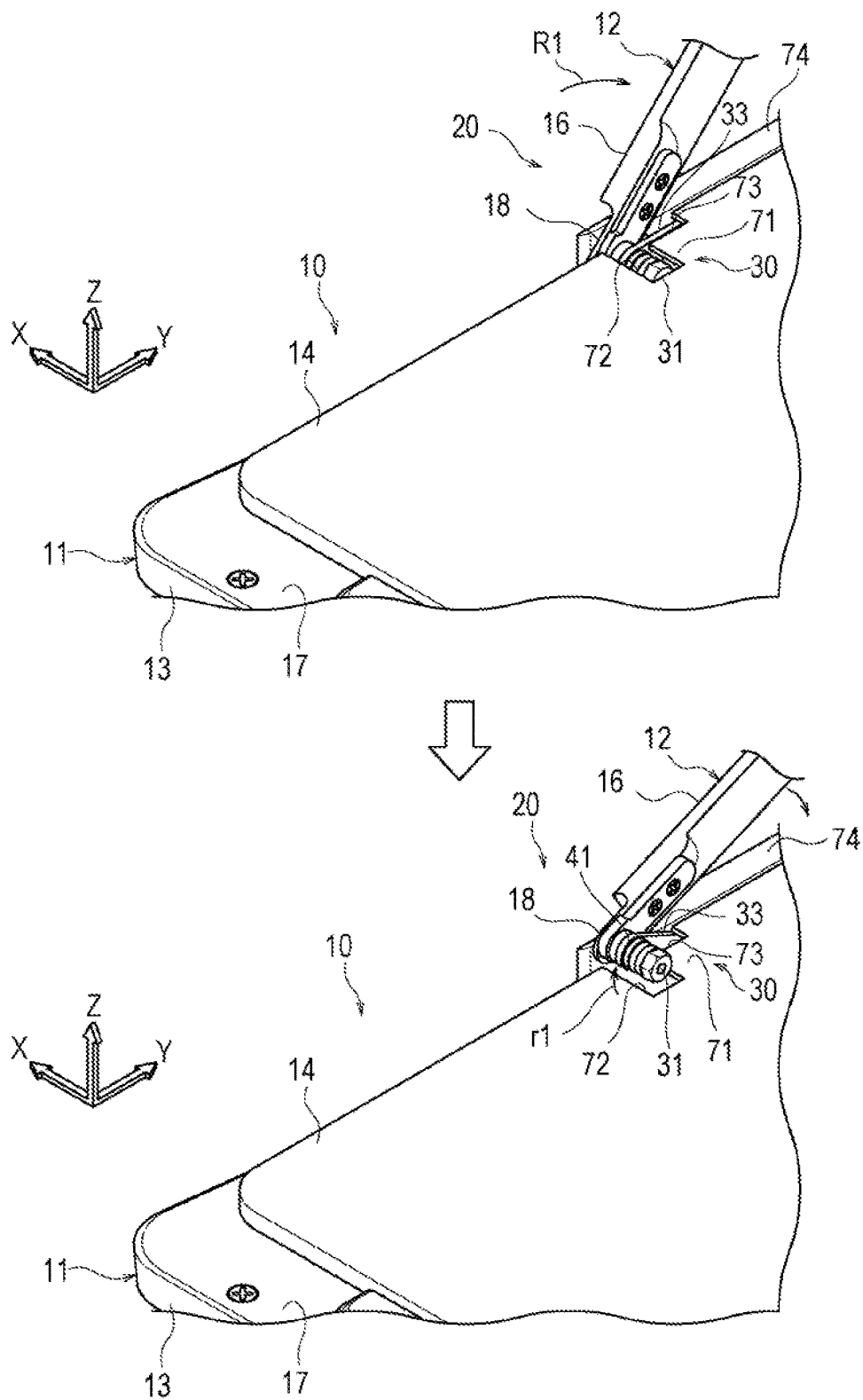
FIG. 5C is a perspective diagram that illustrates a situation in which the stand arm illustrated in FIG. 1 rotates from 135° to 150° with rotation of a coupling member.
Figure 6C:
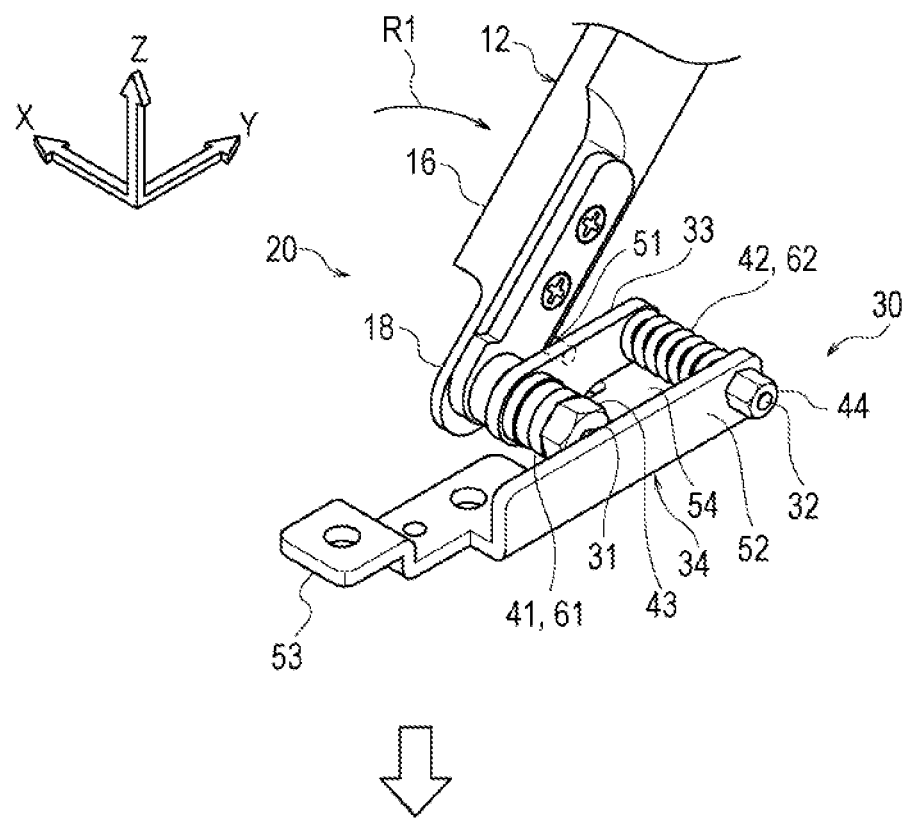
FIG. 6C is a perspective diagram that illustrates an action of the hinge that corresponds to the rotation of the stand arm illustrated in FIG. 5C.
Figure 6C:
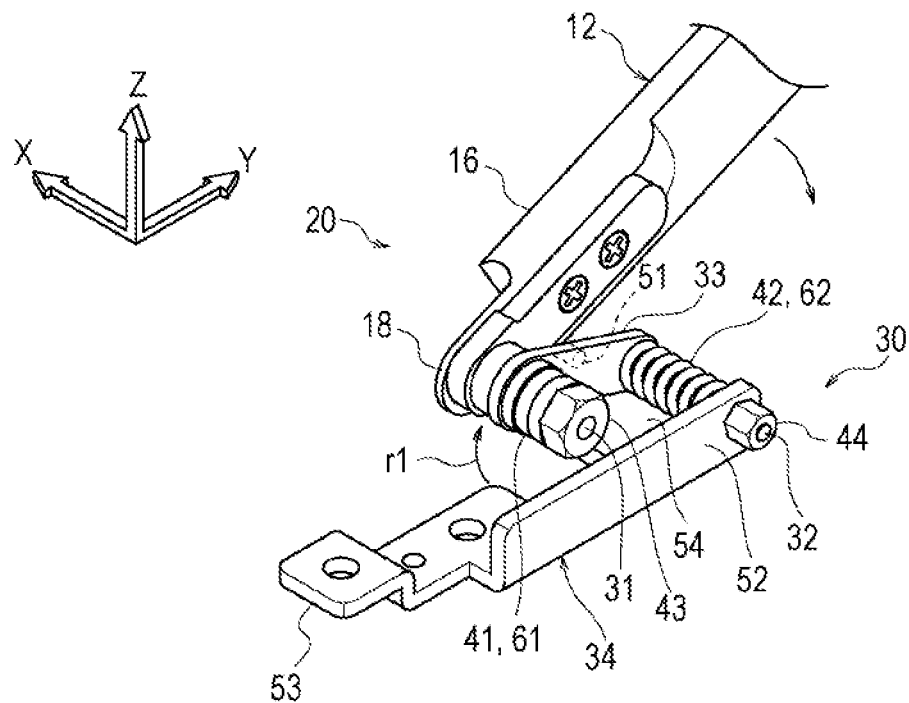

FIG. 5C and FIG. 6C illustrate a situation in which the stand arm 12 rotates from 135° to 150° with the rotation of the coupling member 33. As illustrated in the upper parts to the lower parts of FIG. 5C and FIG. 6C, in a case where an overload is added to the stand arm 12 in the deployed position in the direction to exceed the deployed position, the load in the rotational direction due to the overload is exerted on the coupling member 33.

Then, the restriction of the rotation of the coupling member 33 by the rotation restriction mechanism 42 is released in a case where the load that is exerted on the coupling member 33 exceeds the above-described threshold load. That is, the torsion spring 62 starts elastic deformation in the stretching direction. In a case where the restriction of the rotation of the coupling member 33 by the rotation restriction mechanism 42 is released, the coupling member 33 in the accommodated position rotates, and the stand arm 12 rotates to 135° or more with the rotation of the coupling member 33.

Here, as described above, when the stand arm 12 rotates in the deployment direction from the housed position, the stand arm 12 rotates not in the direction away from the second hinge shaft 32 but toward the side that is closer to the second hinge shaft 32 (see arrow R1 in FIG. 6A and FIG. 6B). Accordingly, in a case where the overload is exerted on the stand arm 12 in the deployed position in the direction to exceed the deployed position, mechanically, the coupling member 33 in the accommodated position does not rotate toward the internal portion of the housing 11 (the front side of the housing 11) but rotates toward the back side of the housing 11 (see arrow r1 in FIG. 6C and FIG. 6D). The rotation of the coupling member 33 toward the back side of the housing 11 will later be described more in detail with reference to FIGS. 10A and 10B.

As described above, in this embodiment, in a case where the overload is added to the stand arm 12, which is regulated in the deployed position by the stopper portion 51, in the direction to exceed the deployed position, the coupling member 33 rotates toward the back side of the housing 11. Then, the stand arm 12 rotates to 135° or more with the rotation of the coupling member 33 toward the back side of the housing 11.

Further, in a case where the stand arm 12 rotates to 135° or more with the rotation of the coupling member 33, the position of the stand arm 12 is regulated by the stopper portion 51, and the angle formed between the stand arm 12 and the coupling member 33 is kept in a particular angle. In this embodiment, the particular angle is set to an acute angle as one example.

(Case where the Stand Arm 12 Rotates from 150° to 180°)

Figure 5D:
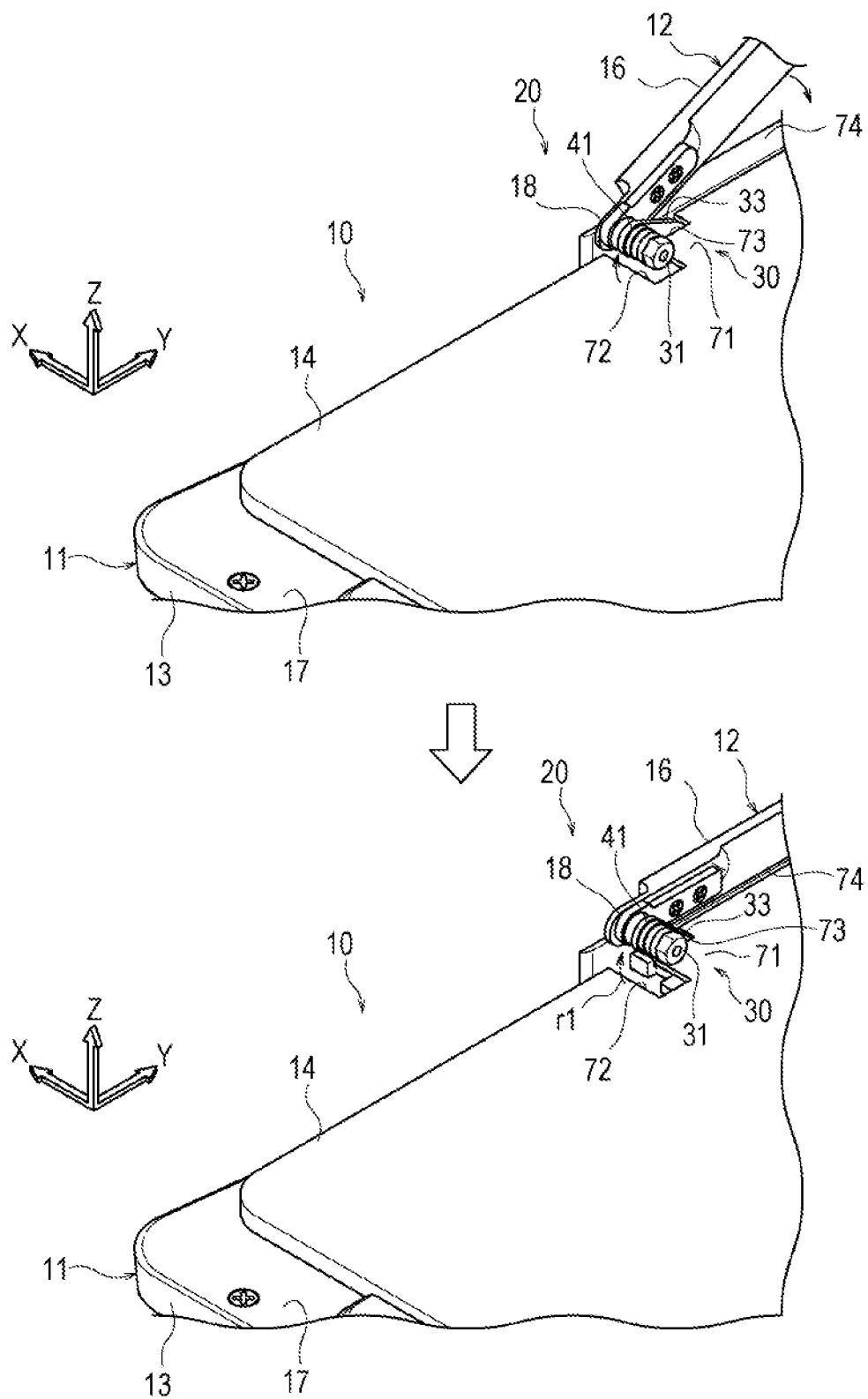
FIG. 5D is a perspective diagram that illustrates a situation in which the stand arm illustrated in FIG. 1 rotates from 150° to 180° with rotation of the coupling member.
Figure 6D:
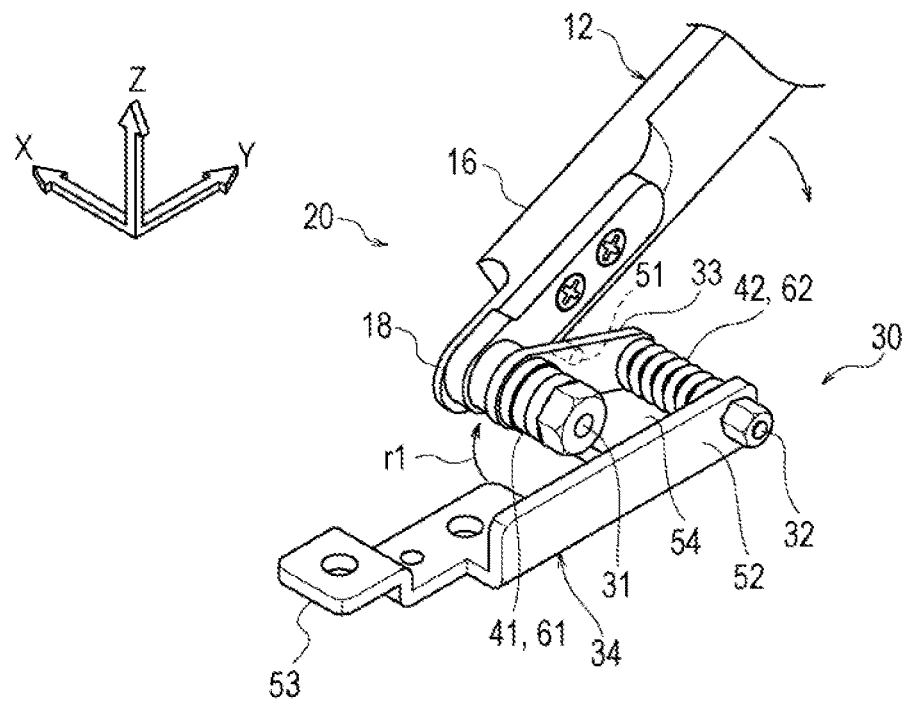
FIG. 6D is a perspective diagram that illustrates an action of the hinge that corresponds to the rotation of the stand arm illustrated in FIG. 5D.
Figure 6D:
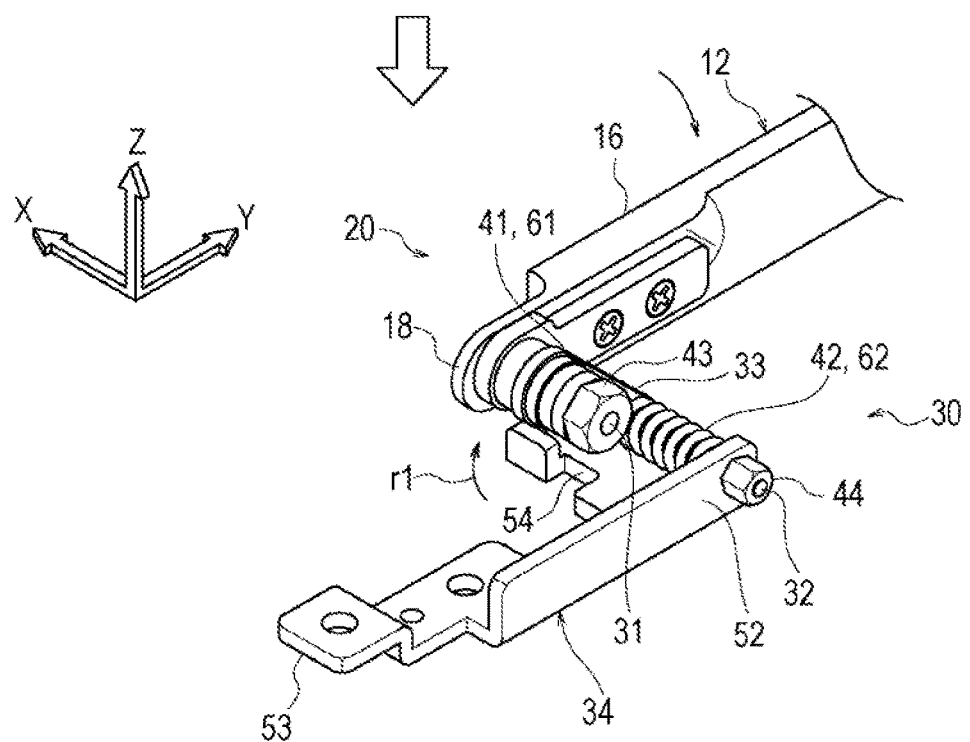

FIG. 5D and FIG. 6D illustrate a situation in which the stand arm 12 rotates from 150° to 180°. As illustrated in the upper parts to the lower parts of FIG. 5D and FIG. 6D, in a case where the stand arm 12 rotates with the rotation of the coupling member 33 due to the overload, the rotational angle of the stand arm 12 eventually becomes 180°. In a case where the rotational angle of the stand arm 12 becomes 180°, the stand arm 12 overlaps with a portion of the back surface portion of the second cover 14, and the rotation of the stand arm 12 is regulated. The portion of the back surface portion of the second cover 14 that overlaps with the stand arm 12 is formed as a stopper surface 74 that regulates the rotation of the stand arm 12. The stopper surface 74 is formed into a planar shape.

Further, in a case where the rotational angle of the stand arm 12 becomes 180° due to the addition of the overload, the coupling member 33 becomes an obliquely rotated state compared to an original state (see the lower part of FIG. 7 also). The rotational position of the coupling member 33 in a case where the coupling member 33 is obliquely rotated will hereinafter be referred to as "actuation position". When the coupling member 33 is in the actuation position, that is, the coupling member 33 is in the position in which the coupling member 33 is rotated to the back side of the housing 11, the one end side of the coupling member 33 protrudes from the accommodating portion 71 to the outside together with the first hinge shaft 31 and the resistance application mechanism 41. That is, the first hinge shaft 31 and the resistance application mechanism 41 protrude to the back side of the housing 11.

In this case, the first hinge shaft 31 and the resistance application mechanism 41 protrude from the accommodating portion 71 to the outside through the first recess portion 72. Further, the one end side of the coupling member 33 (the side provided with the first hinge shaft 31) protrudes from the accommodating portion 71 to the outside through the second recess portion 73.

In this embodiment, the first hinge shaft 31 protrudes to the back side of the housing 11, and the interference between the arm portion 16 and the housing 11 is thereby avoided. Further, the interference between the arm portion 16 and the housing 11 is avoided, the rotation of the stand arm 12 is thereby permitted to 180°, and the stand arm 12 may overlap with the stopper surface 74.

Figure 8B:
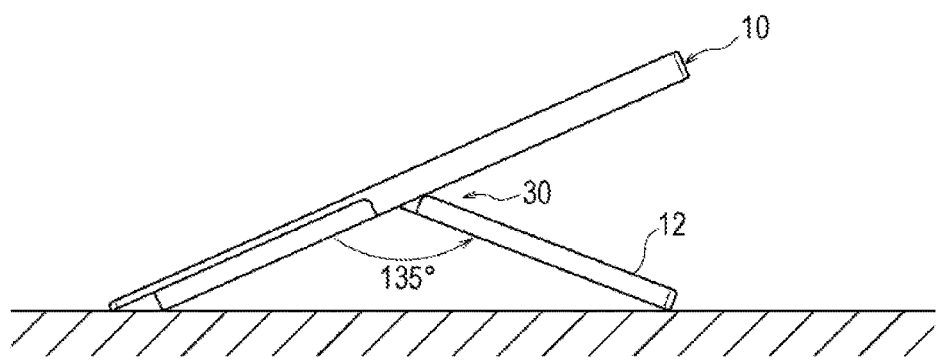
FIG. 8B is a side diagram that illustrates a situation in which the stand arm rotates from 135° to 150° with rotation of the coupling member in the electronic apparatus illustrated in FIG. 1.
Figure 8B:
Figure 8B:
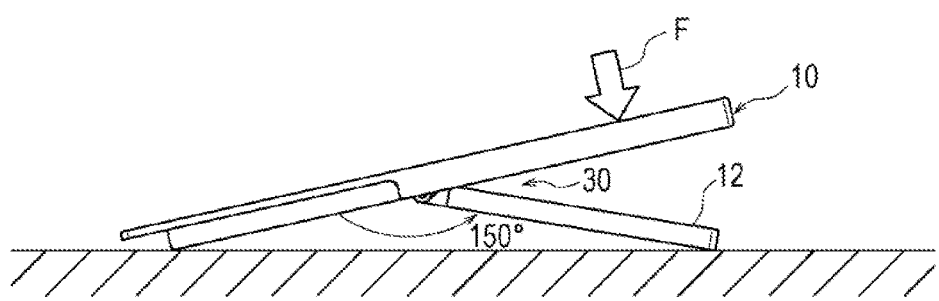
Figure 8C:
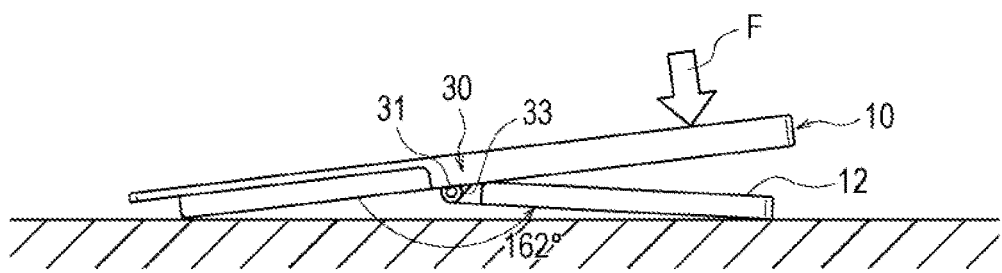
FIG. 8C is a side diagram that illustrates a situation in which the stand arm rotates from 162° to 180° with rotation of the coupling member in the electronic apparatus illustrated in FIG. 1.
Figure 8C:
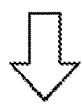
Figure 8C:
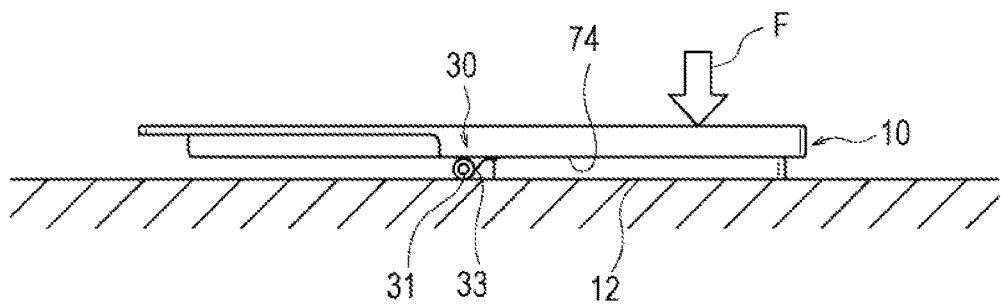

FIG. 8A to FIG. 8C illustrate situations in which the stand arm 12 rotates from 0° to 180° in the electronic apparatus 10. As illustrated in FIG. 8A, the stand arm 12 is deployed from 0° to 90°, and the electronic apparatus 10 may be used while being obliquely rested. The stand arm 12 is mounted on a substantially central portion of the electronic apparatus 10 in the vertical direction. Accordingly, in a state where the stand arm 12 is deployed to 90°, the display instrument provided to the electronic apparatus 10 is in an inclined state at approximately 45° with respect to a placement surface on which the electronic apparatus 10 is placed.

As described above, in the electronic apparatus 10 in this embodiment, the stand arm 12 may be deployed to 135° in the usual use case. For example, the upper part of FIG. 8B illustrates a state where the electronic apparatus 10 is used in a state where the stand arm 12 is deployed to 135°. In a state where the stand arm 12 is deployed to 135°, the display instrument provided to the electronic apparatus 10 is in an inclined state at approximately 22.5° with respect to the placement surface.

Because the electronic apparatus 10 is a tablet terminal as one example, a touch operation by the pen or a finger is performed on the display instrument on the face side of the electronic apparatus 10. In a case where the touch operation by the pen is performed on the display instrument, it may be considered that a palm contacts with a face surface of the electronic apparatus 10 in the touch operation by the pen from the range in which the rotational angle of the stand arm 12 exceeds 90° and an excessive force (overload) is thereby added to the stand arm 12.

The lower part of FIG. 8B illustrates a state where an excessive force F is added to the stand arm 12 and the stand arm 12 rotates to 150° with the rotation of the coupling member 33. Further, FIG. 8C illustrates a situation in which the stand arm 12 rotates to 180° with the rotation of the coupling member 33. Even in a case where the palm contacts with the face surface of the electronic apparatus 10 in the touch operation by the pen and the excessive force F is thereby added to the stand arm 12 in a state where the rotational angle of the stand arm 12 is 135°, the stand arm 12 rotates to 180° with the rotation of the coupling member 33. Accordingly, concentration of a local stress on the stand arm 12 is restrained. Thus, damages such as deformation and fracture to the stand arm 12 are restrained, and damages to the hinge 30 are also restrained.

Further, for example, even in a case where the electronic apparatus 10 is dropped and impact is thereby added to the stand arm 12 in a state where the rotational angle of the stand arm 12 is 135°, the stand arm 12 rotates to 180° with the rotation of the coupling member 33. Further, in a case where the stand arm 12 rotates with the rotation of the coupling member 33, the torsion spring 62 (see FIG. 6D) elastically deforms in the stretching direction. Accordingly, the impact is absorbed by the torsion spring 62. Thus, damages such as deformation and fracture to the stand arm 12 are restrained, and damages to the hinge 30 are also restrained.

Further, in a case where the overload added to the stand arm 12 is removed, the coupling member 33 rotates from the actuation position to the accommodated position due to a restoring force of the torsion spring 62 (see FIG. 6C and FIG. 6D). Consequently, the rotational angle of the stand arm 12 is returned to 135°. Unless an excessive force is again added to the stand arm 12, the rotational angle of the stand arm 12 is maintained at 135°.

Further, in a case where it is desired to house the stand arm 12, the stand arm 12 may be housed by adding an operating force to the stand arm 12 in a housing direction. Further, the first hinge shaft 31 is provided with the resistance application mechanism 41 that has the plural thrust washers 61. Accordingly, it is possible to retain the stand arm 12 at an arbitrary angle between 0° and 135° by the resistance (retaining force) of the resistance application mechanism 41.

Operation and effect of this embodiment will next be described.

(1) As illustrated in FIG. 5C and FIG. 6C, there may be a case where the palm contacts with the face surface of the electronic apparatus 10 in the touch operation by the pen and an excessive force is thereby added to the stand arm 12 in a state where the rotational angle of the stand arm 12 is 135°. However, as illustrated in FIG. 5D and FIG. 6D, even in a case where the excessive force is added to the stand arm 12, the stand arm 12 rotates to 180° with the rotation of the coupling member 33. Accordingly, concentration of a local stress on the stand arm 12 may be restrained. Thus, damages such as deformation and fracture to the stand arm 12 may be restrained, and damages to the hinge 30 may also be restrained.

(2) Even in a case where the electronic apparatus 10 is dropped and impact is thereby added to the stand arm 12 in a state where the rotational angle of the stand arm 12 is 135°, the stand arm 12 rotates to 180° with the rotation of the coupling member 33. Further, in a case where the stand arm 12 rotates with the rotation of the coupling member 33, the torsion spring 62 elastically deforms in the stretching direction. Accordingly, the impact may be absorbed by the torsion spring 62. Thus, even in a case where the electronic apparatus 10 is dropped, damages such as deformation and fracture to the stand arm 12 may be restrained, and damages to the hinge 30 may be restrained.

(3) In a case where an excessive force is added to the stand arm 12, the rotational angle of the stand arm 12 thereby exceeds 135°, and the excessive force added to the stand arm 12 is thereafter removed, the torsion spring 62 is to be restored. Then, the coupling member 33 rotates from the actuation position to the accommodated position due to the restoring force of the torsion spring 62. Consequently, the rotational angle of the stand arm 12 is automatically recovered to 135° (see FIG. 5C and FIG. 6C). Accordingly, because the stand arm 12 does not have to be returned by a hand, usability of the stand arm 12 may be improved.

(4) The second hinge shaft 32 is provided with the rotation restriction mechanism 42. The rotation restriction mechanism 42 restricts the rotation of the coupling member 33 until the load in the rotational direction, which is exerted on the coupling member 33 with respect to the second hinge shaft 32 as the center, exceeds the threshold load. Thus, in a case where the usual operating force is added to the stand arm 12 in the housed position in the deployment direction, the stand arm 12 rotates in the deployment direction from the housed position with respect to the first hinge shaft 31 as the center in a state where the rotation of the coupling member 33 is restricted by the rotation restriction mechanism 42.

Accordingly, as illustrated in FIG. 5A and FIG. 5B, because the coupling member 33 does not rotate while the stand arm 12 is rotated from 0° to 135°, protrusion of the first hinge shaft 31 to the back side of the housing 11 is avoided. Accordingly, for example, compared to a configuration in which the coupling member 33 rotates with the rotation of the stand arm 12 from 0° to 135° and the first hinge shaft 31 protrudes to the back side of the housing 11, design of the peripheral portion of the hinge 30 and further design of the electronic apparatus 10 may be secured.

(5) The accommodating portion 71 is formed in the housing 11. Further, while the stand arm 12 rotates from the housed position to the deployed position (from 0° to 135°), the coupling member 33 is maintained in the accommodated position in which the coupling member 33 and the first hinge shaft 31 together are accommodated in the accommodating portion 71. Accordingly, because a state where the first hinge shaft 31 and the coupling member 33 are accommodated in the accommodating portion 71 is maintained in a range of the usual use case of the stand arm 12, the design of the peripheral portion of the hinge 30 and further the design of the electronic apparatus 10 may be secured.

(6) As illustrated in FIG. 5D, the first hinge shaft 31 protrudes to the back side of the housing 11 in a state where the coupling member 33 rotates to the actuation position, and the interference between the arm portion 16 and the housing 11 is thereby avoided. Further, the interference between the arm portion 16 and the housing 11 is avoided, the rotation of the stand arm 12 is thereby permitted to 180°, and the stand arm 12 overlaps with the stopper surface 74. Accordingly, in a case where the stand arm 12 rotates to 180°, the stand arm 12 may be received by the stopper surface 74. Consequently, concentration of a local stress on the stand arm 12 may be restrained. Thus, damages such as deformation and fracture to the stand arm 12 may be restrained.

Figure 9:
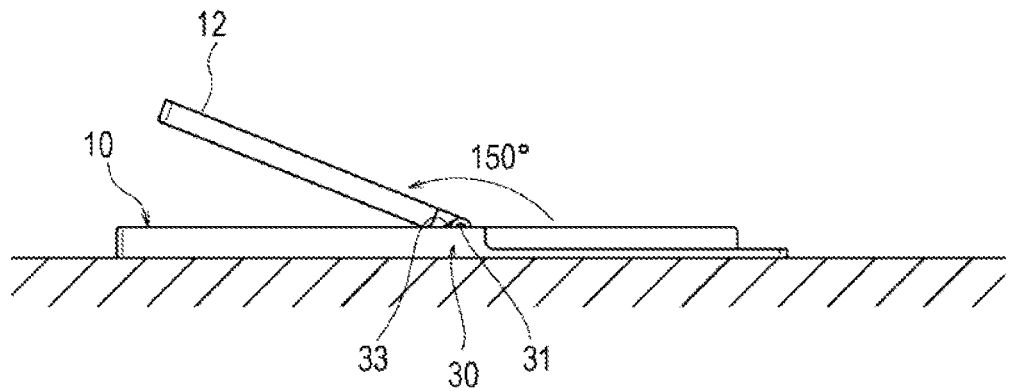
FIG. 9 is a side diagram that illustrates a state where the electronic apparatus illustrated in FIG. 1 is arranged with a back surface up and the stand arm rotates to 150° with rotation of the coupling member.

(7) FIG. 9 illustrates a state where the electronic apparatus 10 is arranged with the back surface up and the stand arm 12 rotates to 150° with the rotation of the coupling member 33. As illustrated in FIG. 9, in a case where an overload is added to the stand arm 12 in the deployed position in the direction to exceed the deployed position, the stand arm 12 rotates with the rotation of the coupling member 33 to the back side of the housing 11. Accordingly, the first hinge shaft 31 that rotatably supports the stand arm 12 moves to the back side of the housing 11 in response to the amount of the rotation of the coupling member 33 to the back side of the housing 11. Consequently, a clearance portion for inhibiting the interference with the stand arm 12 does not have to be formed in the back surface portion of the housing 11, or the clearance portion may be made small. Thus, design of the back surface portion of the housing 11 may be improved.

(8) In a case where the above-described clearance portion for inhibiting the interference with the stand arm 12 is formed in the back surface portion of the housing 11, the clearance portion may constrain a mounting position of an interface connector or the like in the back surface portion in the housing 11. However, as described above, in the electronic apparatus 10 of this embodiment, the clearance portion for inhibiting the interference with the stand arm 12 does not have to be formed in the back surface portion of the housing 11, or the clearance portion may be made small. Thus, the mounting position of the interface connector or the like may be secured in the back surface portion of the housing 11.

Figure 10A:
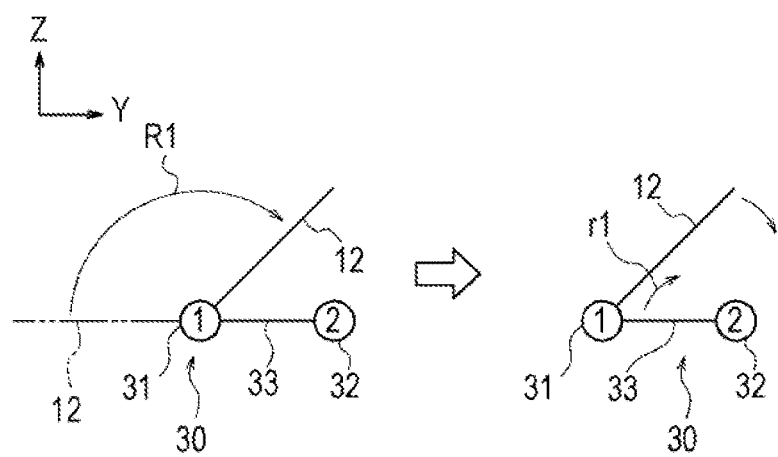
FIG. 10A and FIG. 10B are schematic diagrams that compare the hinge according to this embodiment with a hinge according to a comparative example.

(9) As illustrated in the upper part of FIG. 6A, in a case where the stand arm 12 is in the housed position, the stand arm 12 is arranged on the opposite side (arrow Y1 side) to the second hinge shaft 32 with respect to the first hinge shaft 31. Operation and effect by this structure will be described with reference to FIGS. 10A and 10B. FIG. 10A schematically illustrates a sliding device that employs the hinge 30 according to this embodiment, and FIG. 10B illustrates a sliding device that employs a hinge 130 of a comparative example to the hinge 30 according to this embodiment.

Figure 10B:
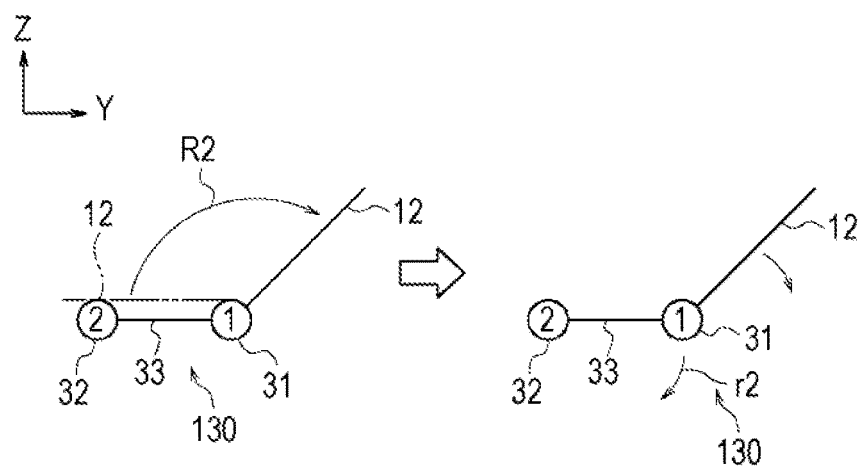

Compared to the hinge 30 according to this embodiment, in the hinge 130 illustrated in FIG. 10B, the first hinge shaft 31 and the second hinge shaft 32 are switched in the arrangement. The stand arm 12 rotates to the side away from the second hinge shaft 32 (arrow R2 side) in a case where the stand arm 12 rotates in the deployment direction from the housed position. Accordingly, in the hinge 130 illustrated in FIG. 10B, the coupling member 33 is pushed down and rotates to arrow r2 side in a case where an overload is added to the stand arm 12 in the deployed position.

As described above, in the structure in which the coupling member 33 is pushed down, the coupling member 33 rotates toward the internal portion of the housing (the front side of the housing). Accordingly, a space for inhibiting the interference with the coupling member 33 has to be provided in the internal portion of the housing such that members or structures that are arranged in the internal portion of the housing do not interfere with the coupling member 33, and the housing thus becomes large (thick).

On the other hand, in the hinge 30 according to this embodiment, which is illustrated in FIG. 10A, the stand arm 12 rotates toward the side that is closer to the second hinge shaft 32 (arrow R1 side) in a case where the stand arm 12 rotates in the deployment direction from the housed position. Further, the coupling member 33 is pushed up and rotates to arrow r1 side in a case where an overload is added to the stand arm 12 in the deployed position. As described above, in the structure in which the coupling member 33 is pushed up, the coupling member 33 rotates toward the outside of the housing (the back side of the housing). Accordingly, because the space for inhibiting the interference with the coupling member 33 does not have to be provided in the internal portion of the housing, the housing may be made small (thin).

In addition, as illustrated in FIG. 5C and FIG. 5D, the coupling member 33 rotates toward the back side of the housing 11, and the first hinge shaft 31 protrudes to the back side of the housing 11 not in the usual use case of the stand arm 12 but in the overloading case where an overload is added to the stand arm 12. Accordingly, as illustrated in FIG. 5A and FIG. 5B, because the protrusion of the first hinge shaft 31 to the back side of the housing 11 is avoided in the usual use case of the stand arm 12, the design of the peripheral portion of the hinge 30 may also be secured.

Note that the above-described hinge 130 illustrated in FIG. 10B corresponds to another embodiment of the techniques disclosed by the present application in a point of inclusion of the "coupling member" and the "rotation restriction mechanism".

(10) As illustrated in FIG. 2 and FIG. 3, the coupling member 33 is formed into a plate shape and arranged to have the axial direction of the first hinge shaft 31 and the second hinge shaft 32 as the plate-thickness direction. Accordingly, an installation space for the coupling member 33 in the horizontal direction of the housing 11 may be narrowed. Consequently, because the arm portion 16 that is adjacent to the coupling member 33 may be designed to be thin, the design of the electronic apparatus 10 may further be improved.

(11) As illustrated in FIG. 2 and FIG. 3, the resistance application mechanism 41 and the rotation restriction mechanism 42 are arranged between the coupling member 33 and the support portion 52 that is provided in parallel with the coupling member 33. Accordingly, because a space between the coupling member 33 and the support portion 52 is effectively utilized as an installation space for the resistance application mechanism 41 and the rotation restriction mechanism 42, the size reduction of the hinge 30 may be intended.

(12) As illustrated in FIG. 2 and FIG. 3, the first hinge shaft 31 and the second hinge shaft 32 are arranged in the same position in the thickness direction of the housing 11 in the flat shape (the same height in the Z-axis direction) in a case where the coupling member 33 is in the accommodated position. Accordingly, for example, compared to a configuration in which the first hinge shaft 31 and the second hinge shaft 32 are arranged in different positions in the thickness direction of the housing 11 in a case where the coupling member 33 is in the accommodated position, the thickness of the housing 11 may be made thin.

Next, modification examples of this embodiment will be described.

(Modification Examples of Stand Arm)

In the above embodiment, the stand arm 12 is formed into an inverted arch shape that has the bottom portion 15 and the pair of arm portions 16 but may be formed as follows.

Figure 11A:
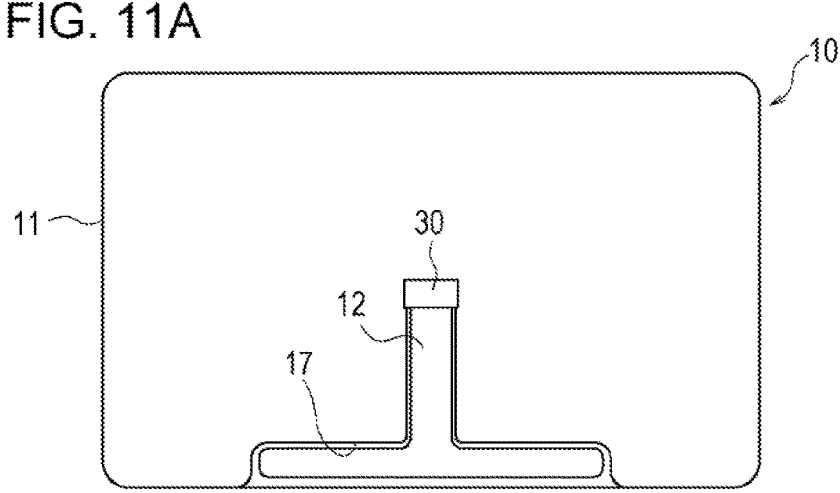
FIG. 11A is a back side diagram that illustrates a first modification example of the stand arm of this embodiment.
Figure 11B:
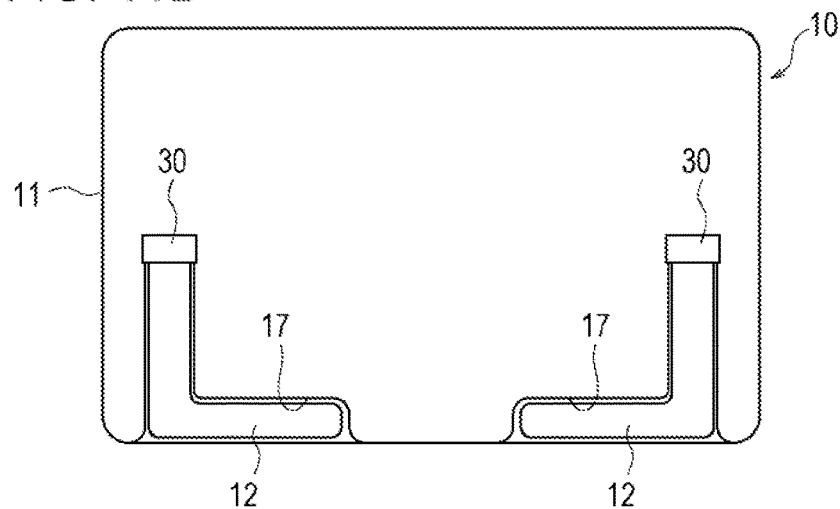
FIG. 11B is a back side diagram that illustrates a second modification example of the stand arm of this embodiment.
Figure 11C:
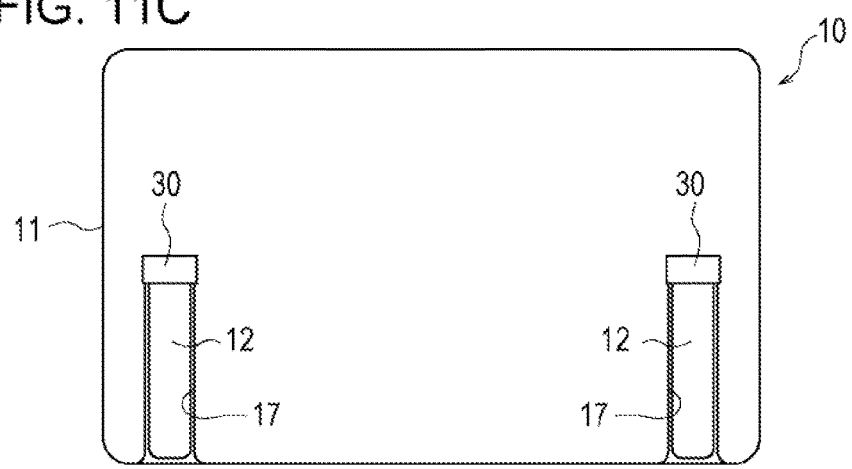
FIG. 11C is a back side diagram that illustrates a third modification example of the stand arm of this embodiment.

FIG. 11A to FIG. 11C illustrate modification examples of the stand arm 12. That is, in the modification example illustrated in FIG. 11A, the stand arm 12 is formed into an inverted T shape. Further, in the modification example illustrated in FIG. 11B, one pair of stand arms 12 is used, and each of the stand arms 12 is formed into an L shape. Further, in the modification example illustrated in FIG. 11C, one pair of stand arms 12 is used, and each of the stand arms 12 is formed into an I shape.

Note that the stand arm 12 may be formed into another shape than the inverted arch shape, the inverted T shape, the L shape, and the I shape.

(Modification Examples of Rotation Restriction Mechanism)

In the above embodiment, the rotation restriction mechanism 42 has the torsion spring 62 but may be configured as follows.

Figure 12A:
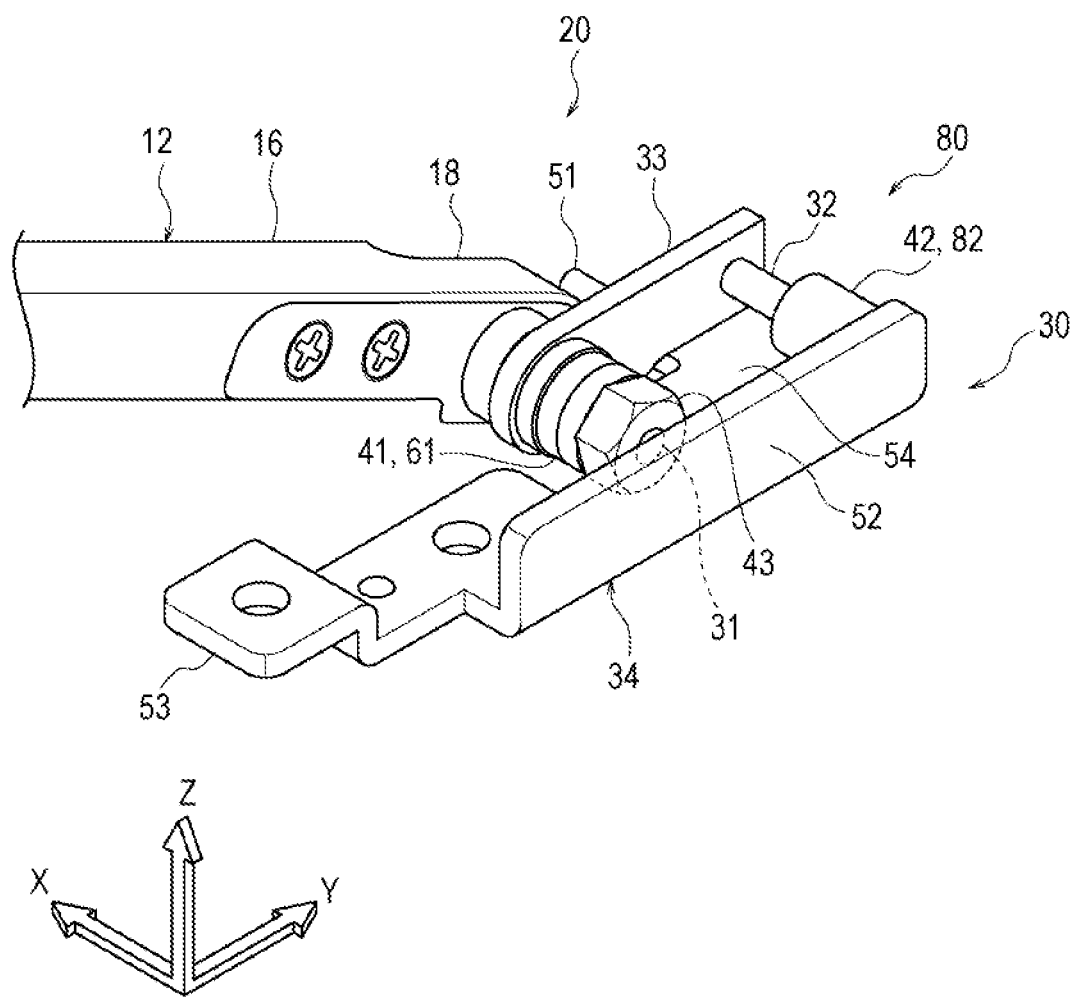
FIG. 12A is a perspective diagram that illustrates a first modification example of a rotation restriction mechanism of this embodiment.
Figure 12B:
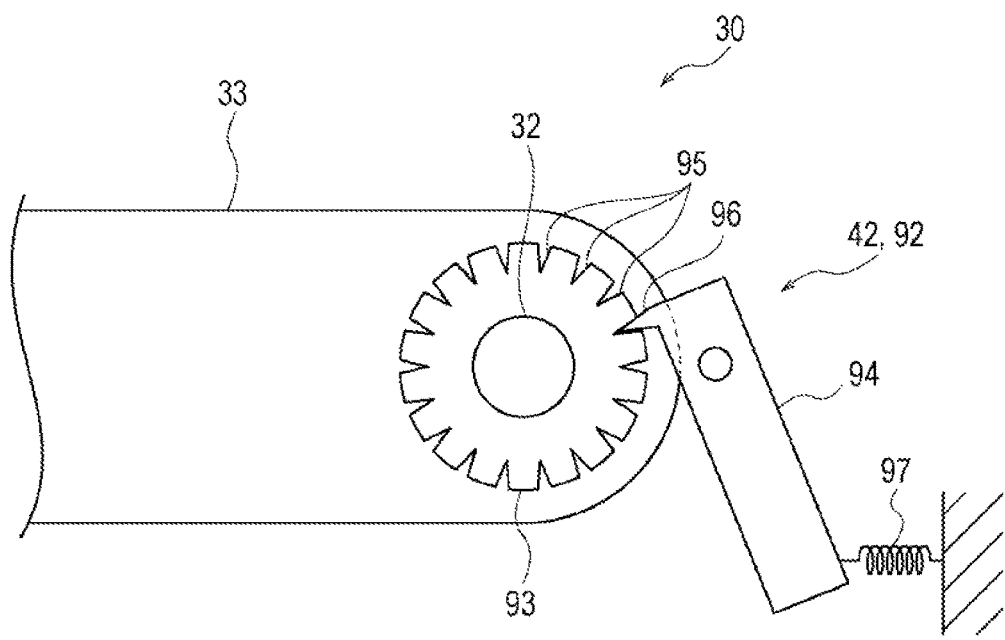
FIG. 12B is a side diagram that illustrates a second modification example of the rotation restriction mechanism of this embodiment

FIG. 12A and FIG. 12B illustrate modification examples of the rotation restriction mechanism 42. In the modification example illustrated in FIG. 12A, instead of the above-described torsion spring 62, a rotary damper 80 is employed. The rotary damper 80 is configured with the second hinge shaft 32 and a rotary damper main body portion 82. The second hinge shaft 32 serves as a rotational axis of the rotary damper 80, and the rotation restriction mechanism 42 is configured to have the rotary damper main body portion 82. The rotary damper main body portion 82 is fixed to the support portion 52. The rotary damper 80 is configured such that a friction force in the rotational direction as the restriction force occurs between the second hinge shaft 32 and the rotary damper main body portion 82. In the modification example illustrated in FIG. 12A, the rotation restriction mechanism 42 restricts the rotation of the coupling member 33 until the load in the rotational direction, which is exerted on the coupling member 33 with respect to the second hinge shaft 32 as the center, exceeds the threshold load.

In the modification example illustrated in FIG. 12A, because the rotary damper 80 is employed instead of the torsion spring 62, an elastic force is not exerted on the coupling member 33. Thus, even in a case where the overload added to the stand arm 12 is removed, the coupling member 33 is maintained in the present rotational position due to the friction force that is exerted between the second hinge shaft 32 and the rotary damper main body portion 82. However, the other functions of the rotation restriction mechanism 42 in this modification example are similar to the above embodiment that uses the torsion spring 62 and may provide similar operation and effect to the above embodiment.

Further, in the modification example illustrated in FIG. 12B, instead of the above-described torsion spring 62, the rotation restriction mechanism 42 has a ratchet mechanism 92. The ratchet mechanism 92 has a rotating body 93 and an engagement member 94. The rotating body 93 is provided coaxially with the second hinge shaft 32 and rotates integrally with the coupling member 33. Plural notches 95 are formed in an outer circumference portion of the rotating body 93. An engagement portion 96 is formed in a tip portion of the engagement member 94, and the engagement portion 96 may engage with each of the plural notches 95. The engagement member 94 is urged to the outer circumference portion side of the rotating body 93 by an elastic member 97. The engagement portion 96 engages with the notches 95, and a retaining force as the restriction force occurs between the engagement portion 96 and the notch 95. In the modification example illustrated in FIG. 12B also, the rotation restriction mechanism 42 restricts the rotation of the coupling member 33 until the load in the rotational direction, which is exerted on the coupling member 33 with respect to the second hinge shaft 32 as the center, exceeds the threshold load.

In the modification example illustrated in FIG. 12B, because the ratchet mechanism 92 is employed instead of the torsion spring 62, an elastic force is not exerted on the coupling member 33. Thus, even in a case where the overload added to the stand arm 12 is removed, the coupling member 33 is maintained in the present rotational position due to the retaining force that is exerted between the rotating body 93 and the engagement member 94. However, the other functions of the rotation restriction mechanism 42 in this modification example are similar to the above embodiment that uses the torsion spring 62 and may provide similar operation and effect to the above embodiment.

Note that the rotation restriction mechanism 42 may be another configuration than the above configurations as long as the configuration restricts the rotation of the coupling member 33 until the load in the rotational direction, which is exerted on the coupling member 33 with respect to the second hinge shaft 32 as the center, exceeds the threshold load.

Further, the rotation restriction mechanism 42 is preferably arranged between the coupling member 33 and the support portion 52 but may be arranged in another place than the place between the coupling member 33 and the support portion 52.

(Other Modification Examples)

In the above embodiment, the hinge 30 is employed for the electronic apparatus but may be employed for another structure than the electronic apparatus. Similarly, the stand device 20 that includes the hinge 30 and the stand arm 12 may be employed for another structure than the electronic apparatus.

Further, as one example, the electronic apparatus 10 is a tablet terminal but may be another electronic apparatus than a tablet terminal.

Further, the hinge 30 as one example of "rotary body" rotatably supports the stand arm 12 but may rotatably support another rotary body than the stand arm 12.

Further, the rotational angle of the stand arm 12 in the deployed position is preferably set to more than 90° and is set to 135° as one example, in this embodiment. However, the rotational angle of the stand arm 12 in the deployed position may be set to another angle than 135°.

Further, the rotational angle of the stand arm 12 in a case where the coupling member 33 is in the actuation position is set to 180° but may be set to another angle than 180°.

Further, the coupling member 33 is preferably formed into a plate shape and is arranged to have the axial direction of the first hinge shaft 31 and the second hinge shaft 32 as the plate-thickness direction. However, the coupling member 33 may be formed into another shape than the plate shape.

Further, the hinge 30 is preferably includes the base member 34. However, a structure portion that corresponds to the base member 34 may be provided to the housing 11 or the like other than the hinge 30.

Further, the first hinge shaft 31 and the second hinge shaft 32 are preferably arranged in the same position in the thickness direction of the housing 11 (the same height in the Z-axis direction) in a case where the coupling member 33 is in the accommodated position. However, the first hinge shaft 31 and the second hinge shaft 32 may be arranged in different positions in the thickness direction of the housing 11 in a case where the coupling member 33 is in the accommodated position.

Further, the resistance application mechanism 41 has the plural thrust washers 61 but may have another member than the plural thrust washers 61.

Further, the planar-shaped stopper surface 74 is preferably formed on the back surface portion of the housing 11, and the stand arm 12 overlaps with the stopper surface 74 with the rotation of the coupling member 33. However, the stand arm 12 may be regulated in the rotational position at 180° by another structure than the planar-shaped stopper surface 74.

In the foregoing, one embodiment of the techniques disclosed by the present application has been described. However, the techniques disclosed by the present application are not limited to the above embodiment. It is matter of course that various modifications other than the above embodiment may be carried out within the scope that does not depart from the gist of the techniques.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A hinge comprising:
   a first hinge shaft that is provided in a rotation fulcrum of a rotary body and rotatably supports the rotary body from a first rotational position to a second rotational position with respect to a housing;
   a second hinge shaft that is provided in parallel with the first hinge shaft;
   a coupling member that couples the first hinge shaft and the second hinge shaft together and is rotatably supported by the second hinge shaft;
   a stopper that is provided to the coupling member and regulates the second rotational position by abutting the rotary body; and
   a rotation restriction mechanism that restricts rotation of the coupling member until a load in a rotational direction, which is exerted on the coupling member with respect to the second hinge shaft as a center, exceeds a threshold load, wherein, when a load for rotating the rotary body from the first rotational position to the second rotational position is exerted on the rotary body, the load in the rotational direction exerted on the coupling member is equal to or less than the threshold load, wherein, when the load in the rotational direction that is exerted on the coupling member is equal to or less than the threshold load, the coupling member is maintained in a state where the coupling member and the first hinge shaft together are accommodated in an accommodating recess of the housing, and when the load in the rotational direction that is exerted on the coupling member exceeds the threshold load, the coupling member and the first hinge shaft together protrude outside from the accommodating recess of the housing.

2. The hinge according to claim 1, further comprising:
a support that supports the second hinge shaft,
wherein the rotation restriction mechanism has a torsion spring, which is retained on the second hinge shaft, whose one end is fixed to the coupling member, and whose other end is fixed to the support.

3. The hinge according to claim 1, further comprising:
a support that supports the second hinge shaft,
wherein the rotation restriction mechanism has a rotary damper main body that is fixed to the support and configures a rotary damper with the second hinge shaft.

4. The hinge according to claim 1,
wherein the rotation restriction mechanism has a ratchet mechanism that includes a rotating body which is provided coaxially with the second hinge shaft, has plural notches in an outer circumference, and integrally rotates with the coupling member and an engagement member which engages with each of the plural notches.

5. The hinge according to claim 1,
wherein the coupling member is formed into a plate shape and is arranged to have an axial direction of the first hinge shaft and the second hinge shaft as a plate-thickness direction.

6. The hinge according to claim 1, further comprising:
a support that is provided in parallel with the coupling member and supports the second hinge shaft,
wherein the rotation restriction mechanism is arranged between the coupling member and the support.

7. A stand device comprising:
a stand arm; and
a hinge that rotatably supports the stand arm,
wherein the hinge includes
a first hinge shaft that is provided in a rotation fulcrum of the stand arm and rotatably supports the stand arm from a first rotational position to a second rotational position with respect to a housing,
a second hinge shaft that is provided in parallel with the first hinge shaft,
a coupling member that couples the first hinge shaft and the second hinge shaft together and is rotatably supported by the second hinge shaft,
a stopper that is provided to the coupling member and regulates the second rotational position by abutting the stand arm, and
a rotation restriction mechanism that restricts rotation of the coupling member until a load in a rotational direction, which is exerted on the coupling member with respect to the second hinge shaft as a center, exceeds a threshold load, wherein, when a load for rotating the stand arm from the first rotational position to the second rotational position is exerted on the stand arm, the load in the rotational direction exerted on the coupling member is equal to or less than the threshold load, wherein, when the load in the rotational direction that is exerted on the coupling member is equal to or less than the threshold load, the coupling member is maintained in a state where the coupling member and the first hinge shaft together are accommodated in an accommodating recess of the housing, and when the load in the rotational direction that is exerted on the coupling member exceeds the threshold load, the coupling member and the first hinge shaft together protrude outside from the accommodating recess of the housing.

8. The stand device according to claim 7,
wherein a rotational angle of the stand arm from the first rotational position to the second rotational position is greater than 90°.

9. The stand device according to claim 7,
wherein, when an operating force to rotate the stand arm to the second rotational position is added to the stand arm in the first rotational position and when the load in the rotational direction that is exerted on the coupling member is equal to or less than the threshold load, the stand arm rotates from the first rotational position to the second rotational position in a state where the rotation of the coupling member is restricted by the rotation restriction mechanism, and when the stand arm is regulated at the second rotational position by the stopper and when the load in the rotational direction that is exerted on the coupling member exceeds the threshold load, restriction of the rotation of the coupling member by the rotation restriction mechanism is released, and the stand arm rotates together with the coupling member.

10. The stand device according to claim 7,
wherein the stand arm is arranged on an opposite side to the second hinge shaft with respect to the first hinge shaft when the stand arm is in the first rotational position.

11. An electronic apparatus comprising:
a housing having an accommodating recess;
a stand arm; and
a hinge that rotatably supports the stand arm with respect to the housing,
wherein the hinge includes
a first hinge shaft that is provided in a rotation fulcrum of the stand arm and rotatably supports the stand arm from a first rotational position to a second rotational position with respect to the housing,
a second hinge shaft that is provided in parallel with the first hinge shaft,
a coupling member that couples the first hinge shaft and the second hinge shaft together and is rotatably supported by the second hinge shaft,
a stopper that is provided to the coupling member and regulates the second rotational position by abutting the stand arm, and
a rotation restriction mechanism that restricts rotation of the coupling member until a load in a rotational direction, which is exerted on the coupling member with respect to the second hinge shaft as a center, exceeds a threshold load, wherein, when a load for rotating the stand arm from the first rotational position to the second rotational position is exerted on the stand arm, the load in the rotational direction exerted on the coupling member is equal to or less than the threshold load, wherein, when an operating force to rotate the stand arm to the second rotational position is added to the stand arm in the first rotational position and when the load in the rotational direction that is exerted on the coupling member is equal to or less than the threshold load, the stand arm rotates from the first rotational position to the second rotational position in a state where the rotation of the coupling member is restricted by the rotation restriction mechanism, and the coupling member is maintained in a state where the coupling member and the first hinge shaft together are accommodated in the accommodating recess of the housing, and when the stand arm is regulated at the second rotational position by the stopper and when the load in the rotational direction that is exerted on the coupling member exceeds the threshold load, restriction of the rotation of the coupling member by the rotation restriction mechanism is released, the stand arm rotates together with the coupling member, and the coupling member and the first hinge shaft together protrude outside from the accommodating recess of the housing.

12. The electronic apparatus according to claim 11, wherein the accommodating recess of the housing accommodates the first hinge shaft and the coupling member while the stand arm rotates from the first rotational position to the second rotational position.

13. The electronic apparatus according to claim 11, wherein the housing has a stopper surface that overlaps with the stand arm when the stand arm is in the second rotational position and the coupling member is in an actuation position in which the coupling member protrudes outside from the accommodating recess.

14. The electronic apparatus according to claim 11, wherein the housing is in a flat shape, and the first hinge shaft and the second hinge shaft are arranged in a same position in a thickness direction of the housing when the coupling member is in an accommodated position.

* * * * *